United States Patent
Kim et al.

(10) Patent No.: US 11,257,290 B2
(45) Date of Patent: Feb. 22, 2022

(54) DECIMATING A THREE-DIMENSIONAL MESH VIA SUCCESSIVE SELF-PARAMETERIZATION

(71) Applicant: Adobe Inc., San Jose, CA (US)

(72) Inventors: Vladimir Kim, Seattle, WA (US); Siddhartha Chaudhuri, Bangalore (IN); Noam Aigerman, San Francisco, CA (US); Hsueh-ti Liu, Toronto (CA); Alec Jacobson, Toronto (CA)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/863,099

(22) Filed: Apr. 30, 2020

(65) Prior Publication Data

US 2021/0343082 A1    Nov. 4, 2021

(51) Int. Cl.
*G06T 17/20* (2006.01)
*G06T 9/00* (2006.01)

(52) U.S. Cl.
CPC ............ *G06T 17/205* (2013.01); *G06T 9/001* (2013.01)

(58) Field of Classification Search
CPC .............................. G06T 17/205; G06T 9/001
See application file for complete search history.

(56) References Cited

U.S. PATENT DOCUMENTS

| | | | |
|---|---|---|---|
| 2017/0032560 A1* | 2/2017 | Dionne | G06T 19/20 |
| 2018/0012407 A1 | 1/2018 | Chuang et al. | |
| 2019/0035140 A1 | 1/2019 | Fricke et al. | |
| 2020/0043228 A1 | 2/2020 | Patrick et al. | |
| 2020/0265552 A1 | 8/2020 | Hemmer et al. | |

OTHER PUBLICATIONS

Noam Aigerman, Roi Poranne, and Yaron Lipman. 2014. Lifted bijections for low distortion surface mappings. ACM Transactions on Graphics (TOG) 33, 4 (2014), 69.

Noam Aigerman, Roi Poranne, and Yaron Lipman. 2015. Seamless surface mappings. ACM Transactions on Graphics (TOG) 34, 4 (2015), 72.

Harry G Barrow, Jay M Tenenbaum, Robert C Bolles, and Helen C Wolf. 1977. Parametric correspondence and chamfer matching: Two new techniques for image matching. Technical Report. SRI International Menlo Park CA Artificial Intelligence Center.

(Continued)

*Primary Examiner* — Sarah Lhymn
(74) *Attorney, Agent, or Firm* — Keller Jolley Preece

(57) ABSTRACT

Methods, systems, and non-transitory computer readable storage media are disclosed for iteratively decimating a three-dimensional mesh utilizing successive self-parameterization. For example, the disclosed system can self-parameterize local geometries of a three-dimensional mesh using surface mappings within a two-dimensional surface mapping space. The disclosed system can collapse edges in the three-dimensional mesh to create new vertices from the collapsed edges. The disclosed system can parameterize the collapsed edges based on the surface mappings to collapse corresponding edges within the surface mapping space. The disclosed system can thus generate a decimated three-dimensional mesh by collapsing edges in the three-dimensional mesh while providing a bijective map between points in the decimated three-dimensional mesh and corresponding points in the three-dimensional mesh.

20 Claims, 13 Drawing Sheets

(56) References Cited

OTHER PUBLICATIONS

Alexander I Bobenko, Helmut Pottmann, and Thilo Rörig. 2019. Multi-Nets. Classification of discrete and smooth surfaces with characteristic properties on arbitrary parameter rectangles. Discrete & Computational Geometry (2019), 1-32.

Alexander M Bronstein, Michael M Bronstein, and Ron Kimmel. 2008. Numerical geometry of non-rigid shapes. Springer Science & Business Media.

Michael M. Bronstein, Joan Bruna, Yann LeCun, Arthur Szlam, and Pierre Vandergheynst. 2016. Geometric deep learning: going beyond Euclidean data. CoRR abs/1611.08097 (2016). arXiv:1611.08097 http://arxiv.org/abs/1611.08097.

Edwin Catmull and James Clark. 1978. Recursively generated B-spline surfaces on arbitrary topological meshes. Computer-aided design 10, 6 (1978), 350-355.

Siddhartha Chaudhuri, Daniel Ritchie, Jiajun Wu, Kai Xu, and Hao (Richard) Zhang. 2020. Learning to Generate 3D Structures. In Eurographics State-of-the-Art Report (STAR).

Paolo Cignoni, Claudio Rocchini, and Roberto Scopigno. 1998. Metro: measuring error on simplified surfaces. In Computer graphics forum, vol. 17. Wiley Online Library, 167-174.

J. Cohen, D. Manocha, and M. Olano. 1997. Simplifying polygonal models using successive mappings. In Proceedings. Visualization '97 (Cat. No. 97CB36155). 395-402. https://doi.org/10.1109/VISUAL.1997.663908.

Jonathan Cohen, Marc Olano, and Dinesh Manocha. 1998. Appearance-preserving simplification. In Proceedings of the 25th annual conference on Computer graphics and interactive techniques. Citeseer, 115-122.

Angela Dai and Matthias Nießner. 2019. Scan2Mesh: From Unstructured Range Scans to 3D Meshes. In Proc. Computer Vision and Pattern Recognition (CVPR), IEEE.

Tony DeRose, Michael Kass, and Tien Truong. 1998. Subdivision surfaces in character animation. In Proceedings of the 25th annual conference on Computer graphics and interactive techniques. Citeseer, 85-94.

Tamal K Dey, Herbert Edelsbrunner, Sumanta Guha, and Dmitry V Nekhayev. 1999. Topology preserving edge contraction. Publ. Inst. Math.(Beograd)(NS) 66, 80 (1999), 23-45.

D Doo. 1978. A subdivision algorithm for smoothing down irregularly shaped polyhedrons.

Daniel Doo and Malcolm Sabin. 1978. Behaviour of recursive division surfaces near extraordinary points. Computer-Aided Design 10, 6 (1978), 356-360.

Nira Dyn, David Levine, and John A Gregory. 1990. A butterfly subdivision scheme for surface interpolation with tension control. ACM transactions on Graphics (TOG) 9, 2 (1990), 160-169.

Haoqiang Fan, Hao Su, and Leonidas J Guibas. 2017. A point set generation network for 3d object reconstruction from a single image. In Proceedings of the IEEE conference on computer vision and pattern recognition. 605-613.

Michael S Floater and Charles A Micchelli. 1997. Nonlinear stationary subdivision. Citeseer.

Michael Garland and Paul S Heckbert. 1997. Surface simplification using quadric error metrics. In Proceedings of the 24th annual conference on Computer graphics and interactive techniques. ACM Press/Addison-Wesley Publishing Co., 209-216.

Thibault Groueix, Matthew Fisher, Vladimir G. Kim, Bryan C. Russell, and Mathieu Aubry. 2018a. 3D-CODED : 3D Correspondences by Deep Deformation. ECCV (2018).

Thibault Groueix, Matthew Fisher, Vladimir G. Kim, Bryan C. Russell, and Mathieu Aubry. 2018b. AtlasNet: A Papier-Mâché Approach to Learning 3D Surface Generation. CVPR (2018).

Rana Hanocka, Amir Hertz, Noa Fish, Raja Giryes, Shachar Fleishman, and Daniel Cohen-Or. 2019. MeshCNN: A Network with an Edge. ACM Transactions on Graphics (TOG) 38, 4 (2019), 90.

Hugues Hoppe, Tony DeRose, Tom Duchamp, Mark Halstead, Hubert Jin, John McDonald, Jean Schweitzer, and Werner Stuetzle. 1994. Piecewise smooth surface reconstruction. In Proceedings of the 21st annual conference on Computer graphics and interactive techniques. ACM, 295-302.

Krishna Murthy J., Edward Smith, Jean-Francois Lafleche, Clement Fuji Tsang, Artem Rozantsev, Wenzheng Chen, Tommy Xiang, Rev Lebaredian, and Sanja Fidler. 2019. Kaolin: A PyTorch Library for Accelerating 3D Deep Learning Research. arXiv:1911.05063 (2019).

Kęstutis Karčiauskas and Jörg Peters. 2018. A new class of guided C2 subdivision surfaces combining good shape with nested refinement. In Computer Graphics Forum, vol. 37. Wiley Online Library, 84-95.

Ladislav Kavan, Dan Gerszewski, Adam W. Bargteil, and Peter-Pike Sloan. 2011. Physics-Inspired Upsampling for Cloth Simulation in Games. ACM Trans. Graph. 30, 4, Article Article 93 (Jul. 2011), 10 pages. https://doi.org/10.1145/2010324.1964988.

Michael Kazhdan and Hugues Hoppe. 2013. Screened poisson surface reconstruction. ACM Transactions on Graphics (TOG) 32, 3 (2013), 29.

Diederik P Kingma and Jimmy Ba. 2014. Adam: A method for stochastic optimization. arXiv preprint arXiv:1412.6980 (2014).

Leif Kobbelt. 1996. Interpolatory subdivision on open quadrilateral nets with arbitrary topology. In Computer Graphics Forum, vol. 15. Wiley Online Library, 409-420.

Leif Kobbelt. 2000. 3-subdivision. In Proc. Siggraph. 103-112.

Ilya Kostrikov, Zhongshi Jiang, Daniele Panozzo, Denis Zorin, and Joan Bruna. 2018. Surface Networks. In Proc. Computer Vision and Pattern Recognition (CVPR), IEEE.

Vladislav Kraevoy and Alla Sheffer. 2004. Cross-parameterization and compatible remeshing of 3D models. ACM Transactions on Graphics (TOG) 23, 3 (2004), 861-869.

Aaron WF Lee, Wim Sweldens, Peter Schröder, Lawrence C Cowsar, and David P Dobkin. 1998. MAPS: Multiresolution adaptive parameterization of surfaces. In Siggraph, vol. 98. 95-104.

Ruihui Li, Xianzhi Li, Chi-Wing Fu, Daniel Cohen-Or, and Pheng-Ann Heng. 2019. PU-GAN: a Point Cloud Upsampling Adversarial Network. ICCV.

Songrun Liu, Zachary Ferguson, Alec Jacobson, and Yotam Gingold. 2017. Seamless: Seam erasure and seam-aware decoupling of shape from mesh resolution. ACM Transactions on Graphics (TOG) 36, 6, Article 216 (Nov. 2017), 15 pages, https://doi.org/10.1145/3130800.3130897.

Yang Liu, Helmut Pottmann, Johannes Wallner, Yong-Liang Yang, and Wenping Wang. 2006. Geometric modeling with conical meshes and developable surfaces. In ACM transactions on graphics (TOG), vol. 25. ACM, 681-689.

Charles Loop. 1987. Smooth subdivision surfaces based on triangles. Master's thesis, University of Utah, Department of Mathematics (1987).

Haggai Maron, Meirav Galun, Noam Aigerman, Miri Trope, Nadav Dym, Ersin Yumer, Vladimir G. Kim, and Yaron Lipman. 2017. Convolutional Neural Networks on Surfaces via Seamless Toric Covers. Siggraph (2017).

Jonathan Masci, Davide Boscaini, Michael M. Bronstein, and Pierre Vandergheynst. 2015. Geodesic convolutional neural networks on Riemannian manifolds. In Proc. of the IEEE International Conference on Computer Vision (ICCV) Workshops. 37-45.

Patrick Mullen, Yiying Tong, Pierre Alliez, and Mathieu Desbrun. 2008. Spectral conformal parameterization. In Computer Graphics Forum, vol. 27. Wiley Online Library, 1487-1494.

Vinod Nair and Geoffrey E Hinton. 2010. Rectified linear units improve restricted boltzmann machines. In Proceedings of the 27th international conference on machine learning (ICML-10). 807-814.

Adam Paszke, Sam Gross, Soumith Chintala, Gregory Chanan, Edward Yang, Zachary DeVito, Zeming Lin, Alban Desmaison, Luca Antiga, and Adam Lerer. 2017. Automatic differentiation in PyTorch. (2017).

Adrien Poulenard and Maks Ovsjanikov. 2018. Multi-directional Geodesic Neural Networks via Equivariant Convolution. In Siggraph Asia.

Emil Praun, Wim Sweldens, and Peter Schröder. 2001. Consistent Mesh Parameterizations. In Proceedings of the 28th Annual Conference on Computer Graphics and Interactive Techniques (Siggraph '01). Association for Computing Machinery, NewYork, NY, USA, 179-184. https://doi.org/10.1145/383259.383277.

(56) References Cited

OTHER PUBLICATIONS

Reinhold Preiner, Tamy Boubekeur, and Michael Wimmer. 2019. Gaussian-Product Subdivision Surfaces. In Siggraph 2019.

Michael Rabinovich, Tim Hoffmann, and Olga Sorkine-Hornung. 2018. The shape space of discrete orthogonal geodesic nets. In Siggraph Asia 2018 Technical Papers. ACM, 228.

Inam Ur Rahman, Iddo Drori, Victoria C Stodden, David L Donoho, and Peter Schröder. 2005. Multiscale representations for manifold-valued data. Multiscale Modeling & Simulation 4, 4 (2005), 1201-1232.

Anurag Ranjan, Timo Bolkart, Soubhik Sanyal, and Michael J. Black. 2018. Generating 3D faces using Convolutional Mesh Autoencoders. In ECCV.

Malcolm A Sabin and Neil A Dodgson. 2004. A circle-preserving variant of the four-point subdivision scheme. Mathematical Methods for Curves and Surfaces: Tromsø (2004), 275-286.

Scott Schaefer, Etienne Vouga, and Ron Goldman. 2008. Nonlinear subdivision through nonlinear averaging. Computer Aided Geometric Design 25, 3 (2008), 162-180.

John Schreiner, Arul Asirvatham, Emil Praun, and Hugues Hoppe. 2004. Inter-Surface Mapping. ACM Trans. Graph. 23, 3 (Aug. 2004), 870-877. https://doi.org/10.1145/1015706.1015812.

V. Sitzmann, J. Thies, F. Heide, M. Nießner, G. Wetzstein, and Zollhöfer. 2019. Deep Voxels: Learning Persistent 3D Feature Embeddings. In Proc. Computer Vision and Pattern Recognition (CVPR), IEEE.

Olga Sorkine. 2005. Laplacian mesh processing. In Eurographics (STARs). 53-70.

Jos Stam. 1998. Exact Evaluation of Catmull-Clark Subdivision Surfaces at Arbitrary Parameter Values. In Proc. Siggraph. 395-404.

Qingyang Tan, Lin Gao, Yu-Kun Lai, and Shihong Xia. 2018. Variational Autoencoders for Deforming 3D Mesh Models. In Conference on Computer Vision and Pattern Recognition (CVPR).

Chengcheng Tang, Xiang Sun, Alexandra Gomes, Johannes Wallner, and Helmut Pottmann. 2014. Form-Finding with Polyhedral Meshes Made Simple. ACM Trans. Graph. 33, 4, Article Article 70 ((Jul. 2014), 9 pages, https://doi.org/10.1145/2601097. 2601213.

Maxim Tatarchenko, Stephan R. Richter, René Ranftl, Zhuwen Li, Vladlen Koltun, and Thomas Brox. 2019. What Do Single-view 3D Reconstruction Networks Learn? CVPR.

Robert F. Tobler, Stefan Maierhofer, and Alexander Wilkie. 2002a. Mesh-Based Parametrized L-Systems and Generalized Subdivision for Generating Complex Geometry. International Journal of Shape Modeling 8, 2 (2002), 173-191.

Robert F. Tobler, Stefan Maierhofer, and Alexander Wilkie. 2002b. A Multiresolution Mesh Generation Approach for Procedural Definition of Complex Geometry. In Proc. SMI.

Oliver Van Kaick, Hao Zhang, Ghassan Hamarneh, and Daniel Cohen-Or. 2011. A survey on shape correspondence. In Computer Graphics Forum, vol. 30. Wiley Online Library, 1681-1707.

Amir Vaxman, Christian Müller, and Ofir Weber. 2018. Canonical Mobius subdivision.In Siggraph Asia 2018 Technical Papers. ACM, 227.

Luiz Velho, Ken Perlin, Henning Biermann, and Lexing Ying. 2002. Algorithmic shape modeling with subdivision surfaces. Computers & Graphics 26, 6 (2002), 865-875.

Matthias Vestner, Roee Litman, Emanuele Rodolà, Alex Bronstein, and Daniel Cremers. 2017. Product manifold filter: Non-rigid shape correspondence via kernel density estimation in the product space. In Proceedings of the IEEE Conference on Computer Vision and Pattern Recognition. 3327-3336.

N. Wang, Y. Zhang, Z. Li, Y. Fu, W. Liu, and Y. Jiang. 2018. Pixel2Mesh: Generating 3D Mesh Models from Single RGB Images. In ECCV.

Yu Wang, Vladimir G. Kim, Michael Bronstein, and Justin Solomon. 2019. Learning Geometric Operators on Meshes. ICLR Workshop on Representation Learning on Graphs and Manifolds (2019).

C. Wen, Y. Zhang, Z. Li, and Y. Fu. 2019. Pixel2Mesh++: Multi-View 3D Mesh Generation via Deformation. In ICCV.

Wang Yifan, Noam Aigerman, Vladimir G. Kim, Siddhartha Chaudhuri, and Olga Sorkine-Hornung. 2019a. Neural Cages for Detail-Preserving 3D Deformations. arXiv:cs.GR/1912.06395.

Wang Yifan, Shihao Wu, Hui Huang, Daniel Cohen-Or, and Olga Sorkine-Hornung. 2019b. Patch-Based Progressive 3D Point Set Upsampling. In The IEEE Conference on Computer Vision and Pattern Recognition (CVPR).

Lequan Yu, Xianzhi Li, Chi-Wing Fu, and Daniel Cohen-Orand Pheng-Ann Heng. 2018. PU-Net: Point Cloud Upsampling Network. In CVPR.

Denis Zorin. 2007. Subdivision on arbitrary meshes: algorithms and theory. In Mathematics and Computation in Imaging Science and Information Processing. World Scientific, 1-46.

Denis Zorin, Peter Schroder, T De Rose, L Kobbelt, A Levin, and W Sweldens. 2000. Subdivision for modeling and animation. Siggraph Course Notes (2000).

Denis Zorin, Peter Schröder, and Wim Sweldens. 1996. Interpolating Subdivision for Meshes of Arbitary Topology. (1996).

U.S. Appl. No. 16/863,189, Jul. 15, 2021, Office Action.

U.S. Appl. No. 16/863,189, filed Oct. 21, 2021, Office Action.

\* cited by examiner

DECIMATING A THREE-DIMENSIONAL MESH VIA SUCCESSIVE SELF-PARAMETERIZATION

BACKGROUND

Improvements to computer processing technologies have led to significant advancements in the field of digital three-dimensional modeling. For example, computer processing speeds and resources have provided many different types of systems the ability to generate and render three-dimensional models in a variety of computing and other environments. For example, systems use three-dimensional models in digital media for entertainment (e.g., movies, TV shows, video), advertising media in digital and print environments, augmented/virtual reality environments, and medical imaging devices.

Editing, rendering, storing, and transmitting three-dimensional models with high levels of detail, however, can be a difficult and resource-expensive task. Specifically, three-dimensional models typically include meshes with vertices that define polygonal faces with textures applied to the surfaces of the models. Increasing the number of vertices can increase the amount of detail possible in a three-dimensional model, but it also increases the amount of processing power and time required to render the three-dimensional model (e.g., when applying textures and lighting to the model) as a final product. Additionally, fine meshes with a large number of vertices, particularly when combined with other high-quality meshes in a scene, can result in greater computing resource usage when storing and/or transmitting the scenes.

As such, for many applications (e.g., real-time rendering, transferring/downloading of models, geometry processing) it is desirable to produce a coarser version of a three-dimensional model with fewer polygons that is similar to the original higher resolution three-dimensional model. Unfortunately, conventional mesh decimation systems suffer from a number of drawbacks.

For example, some conventional mesh decimation techniques are inflexible in that they do not support edge collapse. The lack of the ability of support edge collapsing during the decimation process results in coarser versions of a mesh with poor quality. Indeed such conventional systems limit the type of mesh simplifications that can be produced.

Other conventional mesh decimation techniques support edge collapses but do not utilize conformal mapping to maintain correspondence between the coarser version and the original higher resolution three-dimensional model. Conventional mesh decimation techniques that generate mesh decimations with a lack of correspondence can prevent the ability to transfer textures from the higher resolution version to the coarser version. Furthermore, conventional mesh decimation techniques that generate mesh decimations with a lack of correspondence can also prevent the ability to transfer edits (deformations, parameterizations, etc.) from the coarse version of the three-dimensional model to the higher resolution version.

SUMMARY

One or more embodiments provide benefits and/or solve one or more of the foregoing or other problems in the art with systems, methods, and non-transitory computer readable storage media that utilizes successive self-parameterization of a three-dimensional mesh with edge collapsing to generate a coarse three-dimensional mesh. To illustrate, the disclosed systems can self-parameterize local geometries of the three-dimensional mesh using surface mappings within a two-dimensional surface mapping space. Specifically, the disclosed systems can collapse edges in the three-dimensional mesh to create new vertices from the collapsed edges. The disclosed systems can then parameterize the collapsed edges (e.g., the new vertices) by utilizing surface mappings of the local geometries to the two-dimensional surface mapping space to collapse corresponding edges within the two-dimensional surface mapping space. The disclosed systems can also generate a decimated three-dimensional mesh by collapsing the edges in the three-dimensional mesh. By preserving parameterization of the three-dimensional mesh after collapsing edges in the three-dimensional mesh, the disclosed systems provide a bijective map between points in the decimated three-dimensional mesh and corresponding points in the three-dimensional mesh.

Additional features and advantages of one or more embodiments of the present disclosure will be set forth in the description below.

BRIEF DESCRIPTION OF THE DRAWINGS

Various embodiments will be described and explained with additional specificity and detail through the use of the accompanying drawings in which.

DETAILED DESCRIPTION

Figure 1:
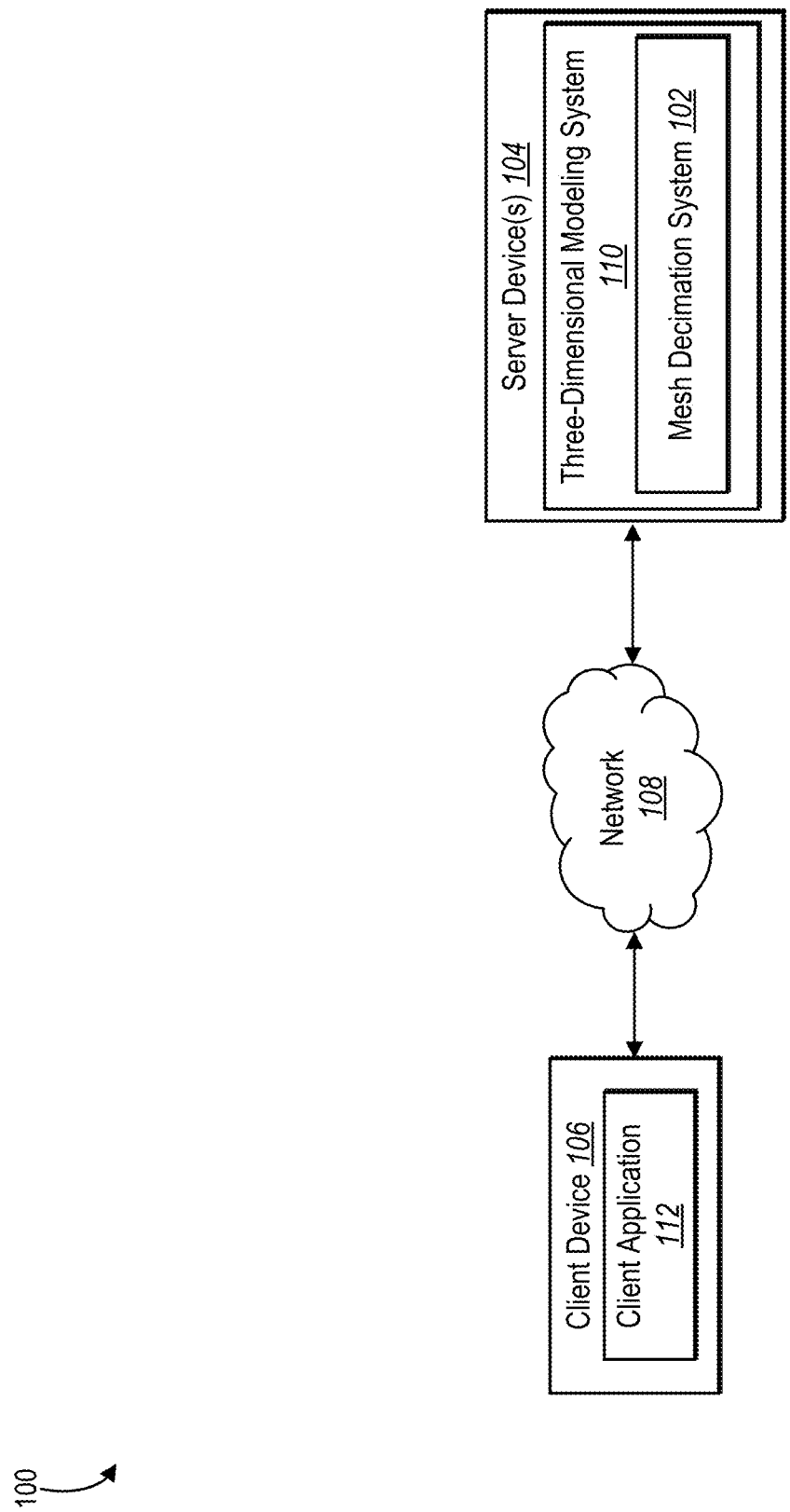
FIG. 1 illustrates an example system environment in which a mesh decimation system can operate in accordance with one or more implementations.

One or more embodiments of the present disclosure include a mesh decimation system that utilizes successive self-parametrization of a three-dimensional mesh to generate a decimated three-dimensional model. In particular, the mesh decimation system can determine a parameterization for a three-dimensional mesh by mapping vertices on a surface of the three-dimensional mesh to a two-dimensional surface mapping space (e.g., a UV space) according to local geometries the three-dimensional mesh. The mesh decimation system can perform a number of decimation iterations of the three-dimensional mesh by collapsing edges according to an edge-collapse algorithm. Based on the surface mapping to the two-dimensional surface mapping space, the mesh decimation system can also collapse corresponding edges in the two-dimensional surface mapping space. By performing successive self-parameterization of the local geometries for the iterative decimations of the three-dimensional mesh, the mesh decimation system can efficiently generate a final decimated three-dimensional mesh that maintains a bijective map between the final decimated three-dimensional mesh and the input three-dimensional mesh. Furthermore, the mesh decimation system can accurately and efficiently generate coarse-fine mesh pairs with bijective mappings for learning parameters of neural networks to subdivide input meshes.

As mentioned, the mesh decimation system can determine a surface mapping between a three-dimensional mesh and a two-dimensional surface mapping space. In one or more embodiments, the mesh decimation system can identify local geometries of edges in a three-dimensional triangle mesh in which the vertices form triangular faces along a surface of the mesh. For example, the mesh decimation system can identify a local geometry of an edge to include a one-ring ("1-ring") neighborhood of vertices connected to the edge via additional edges within the mesh. By identifying the local geometry of each edge to be collapsed in the mesh according to the surrounding vertices, the mesh decimation system can map the local geometries of the edges to local geometries of corresponding edges in the two-dimensional surface mapping space. The mesh decimation system can also utilize conformal flattening to map the local geometries in the three-dimensional mesh to coordinates of the two-dimensional surface mapping space.

In one or more additional embodiments, the mesh decimation system can also collapse edges in a three-dimensional mesh. Specifically, the mesh decimation system can utilize an edge-collapse algorithm to collapse edges in the three-dimensional mesh by combining vertices that form the edges to create new vertices. The mesh decimation system can perform the edge collapses according to a set of collapse validity criteria to ensure that each edge collapse is a valid edge collapse. Additionally, when collapsing edges in the three-dimensional mesh, the mesh decimation system can maintain the local geometries of the collapsed edges by preserving the boundaries of the local geometries of the edges after the edge collapses.

In connection with collapsing the edges in the three-dimensional mesh, the mesh decimation system can also collapse corresponding edges in the two-dimensional surface mapping space. In particular, the mesh decimation system can use the previously determined surface mapping between the three-dimensional mesh and the two-dimensional surface mapping space to combine vertices in the two-dimensional surface mapping space to create new vertices that correspond to the new vertices in the three-dimensional mesh. For example, the mesh decimation system can perform an additional conformal flattening of a local geometry of a collapsed edge to update the mapping of the local geometry (e.g., by re-parametrizing the local geometry) to the two-dimensional surface mapping space. In one or more embodiments, the mesh decimation system can also maintain a fixed boundary for mapping the local geometry before and after collapsing the edge in the two-dimensional surface mapping space.

In one or more embodiments, the mesh decimation system can also generate a decimated three-dimensional mesh. For instance, the mesh decimation system can use successive self-parameterization in connection with edge collapses in the three-dimensional mesh to perform a plurality of mesh decimation iterations. At each iteration of the mesh decimation process, the mesh decimation system can generate a decimated three-dimensional mesh. Accordingly, for a plurality of mesh decimation iterations, the mesh decimation system can generate successive decimated three-dimensional meshes, resulting in a final decimated three-dimensional mesh. Because the mesh decimation system provides bijective maps for each decimation iteration, the mesh decimation system can provide a final bijective map between the final decimated three-dimensional mesh and the input three-dimensional mesh.

Additionally, in one or more embodiments, the mesh decimation system can utilize one or more decimated three-dimensional meshes to learn parameters of a mesh subdivision neural network. Specifically, the mesh decimation system can utilize successive self-parameterization to generate one or more pairs of fine/coarse three-dimensional meshes with corresponding bijective maps. The mesh decimation system can then use a coarse (e.g., high-quality) three-dimensional mesh as an input to the mesh subdivision neural network to predict a subdivided three-dimensional mesh. The mesh decimation system can further compare the predicted mesh to the fine three-dimensional in the fine/coarse pair of meshes to determine a loss, which the mesh decimation system can then use to learn parameters of the mesh subdivision neural network.

The disclosed mesh decimation system can provide a number of advantages over conventional systems. For example, one or more embodiments of the mesh decimation system can both support edge collapses while maintaining high-quality bijective maps. As such, the mesh decimations system is flexible and not limited to vertex collapses. Indeed, the mesh decimation system is robust and can utilize essentially any edge-collapse algorithm while at the same time maintaining the bijective maps. By maintaining bijective mappings, the mesh decimation system can allow for the transfer of textures from a higher resolution version of a three-dimensional model to a coarse version. Additionally, mesh decimation system can allow for the transfer of edits (deformations, parameterizations, etc.) from a coarse version of a three-dimensional model to a higher resolution version.

Additionally, the mesh decimation system can improve the accuracy relative to conventional systems that generate and/or process three-dimensional models. To illustrate, while some conventional models perform processes for mesh generation, subdivision, or decimation that result in inaccurate or inconsistent parameterization correspondences, the mesh decimation system can decimate three-dimensional meshes while maintaining uniform, dense correspondences between the input three-dimensional meshes and the decimated three-dimensional meshes. Indeed, by utilizing successive self-parameterization during decimation of a three-dimensional mesh, the mesh decimation system can intrinsically determine parameterization without requiring a predetermined surface map (e.g., a UV map).

Furthermore, the mesh decimation system can more flexibly decimate three-dimensional meshes relative to conventional systems. Specifically, as noted previously, some conventional systems require the use of specific UV map or a specific decimation algorithm. In contrast to the conventional systems, the mesh decimation system can accurately perform decimation iterations on a three-dimensional mesh utilizing any edge-collapse algorithm while outputting a bijective map between the decimated three-dimensional mesh and the original three-dimensional mesh.

Additionally, the mesh decimation system can provide improvements to computing devices that implement mesh decimation processes. For instance, the mesh decimation system can provide efficiency and accuracy in generating training data for learning parameters of a neural network that subdivides three-dimensional meshes. In particular, by generating coarse three-dimensional meshes from high-quality three-dimensional meshes by utilizing successive self-parameterization, the mesh decimation system can generate training data that includes fine/coarse pairs of three-dimensional meshes with accurate bijective maps between the fine/coarse meshes. The mesh decimation system can thus efficiently provide meshes for inputting to a neural network and comparing to the output of the neural network (in conjunction with the bijective maps) to more accurately learn parameters of the neural network.

As illustrated by the foregoing discussion, the present disclosure utilizes a variety of terms to describe features and advantages of the mesh decimation system. Additional detail is now provided regarding the meaning of such terms. For example, as used herein, the term "three-dimensional mesh" refers to a digital representation of an object in three dimensions. For example, a three-dimensional mesh can include a collection of vertices, edges, and faces that define the shape of the object in three dimensions. Specifically, a three-dimensional mesh can include a number of vertices (or individual points) that connect to form edges, which then define faces representing a surface of the object.

Relatedly, as used herein, the term "vertex" refers to an individual point within a three-dimensional mesh that connects to other vertices in the three-dimensional mesh to form a surface. Additionally, as used herein, the term "edge" refers to a connecting line between two vertices within a three-dimensional mesh. Furthermore, as used herein, the term "face" refers to a polygon formed by three or more edges (and therefore, three or more vertices) within a three-dimensional mesh. As an example, a three-dimensional triangle mesh includes vertices that define triangular faces representing the surface of the object. A computing device can then render a three-dimensional mesh by rendering lines for edges and/or the faces.

As used herein, the term "local geometry" refers to a coordinate frame corresponding to a particular patch of vertices within a three-dimensional mesh. Specifically, a local geometry can include a coordinate frame that corresponds to a one-ring neighborhood of vertices involving a particular edge or vertex and a plurality of vertices connected to the particular edge or vertex via a plurality of edges. For instance, a local geometry for an edge can include a plurality of vertices connected, via a plurality of additional edges, to vertices that form the edge (e.g., at endpoints of the edge).

As used herein, the terms "two-dimensional surface mapping space" and "surface mapping space" refer to a coordinate space that includes a two-dimensional representation of a surface, or portion of a surface, of a three-dimensional mesh. For example, a two-dimensional surface mapping space can include a UV space in which a surface of a three-dimensional mesh is represented in terms of (u,v) coordinates. Accordingly, as used herein, the term "surface mapping" refers to a mapping of a set of vertices from a surface of a three-dimensional mesh to vertices in a two-dimensional surface mapping space. To illustrate, a surface mapping can include a mapping of vertices in a local geometry (e.g., a 1-ring neighborhood) of an edge to corresponding vertices in a UV space.

As used herein, the term "self-parameterization" refers to a mapping of a three-dimensional mesh to a decimated version of the three-dimensional mesh. For example, a self-parameterization of a three-dimensional mesh can include a bijective map between points in the three-dimensional mesh to points in a coarser version of the three-dimensional mesh after collapsing edges of the three-dimensional mesh. Successive self-parameterizations thus include a plurality of self-parameterizations across a plurality of operations for decimating a three-dimensional mesh.

As used herein, the term "decimated three-dimensional mesh" refers to a three-dimensional mesh that has had fewer vertices than a higher-resolution three-dimensional mesh by removing vertices from the higher-resolution three-dimensional mesh. For example, a decimated three-dimensional mesh can include a lower-resolution three-dimensional mesh from which vertices have been removed via collapsing edges in a higher-resolution three-dimensional mesh. Additionally, a final decimated three-dimensional mesh can result from a plurality of decimation operations that each result in a separate decimated three-dimensional mesh with successively lower resolution.

As used herein, the term "neural network" refers to one or more computer algorithms that can be tuned (e.g., trained) based on inputs to approximate unknown functions. In particular, a neural network can include a machine-learning model that utilizes algorithms to learn from, and make determinations on, known data by analyzing the known data to learn to generate outputs that reflect patterns and attributes of the known data. For instance, a neural network can include, but is not limited to, a multi-layer perceptron, a convolutional neural network, a recurrent neural network, a generative adversarial neural network, a variational autoencoder, a feed forward neural network, or a graph neural network. A neural network can learn high-level abstractions in data to generate data-driven determinations, predictions, or decisions from the known input data. For example, in one or more embodiments, the mesh decimation system can provide decimated three-dimensional meshes to learn parameters of one or more neural networks to subdivide three-dimensional meshes.

Additional detail will now be provided regarding the mesh decimation system in relation to illustrative figures portraying exemplary implementations. To illustrate, FIG. 1 includes an embodiment of a system environment 100 in which a mesh decimation system 102 can operate. In particular, the system environment 100 includes server device(s) 104 and a client device 106 in communication via a network 108. Moreover, as shown, the server device(s) 104 include a three-dimensional modeling system 110, which includes the mesh decimation system 102. Additionally, the client device 106 can include a client application 112.

As shown in FIG. 1, the server device(s) 104 can include or host the three-dimensional modeling system 110. The three-dimensional modeling system 110 can include, or be part of, one or more systems that implement modeling and rendering of objects and/or scenes in a digital, three-dimensional environment. For example, the three-dimensional modeling system 110 can provide tools for viewing, generating, editing, and/or otherwise interacting with three-dimensional meshes within digital three-dimensional environments. The three-dimensional modeling system 110 can use the three-dimensional meshes in a variety of applications such as databases of three-dimensional assets, virtual or augmented reality environments, or other environments that utilize three-dimensional models. In one or more embodiments, the three-dimensional modeling system 110 can provide reconstructed three-dimensional models to another system such as a system/application at the client device 106 or a third-party system.

In connection with providing tools for interacting with three-dimensional meshes, the three-dimensional modeling system 110 can utilize the mesh decimation system 102 to decimate three-dimensional meshes. For example, the three-dimensional modeling system 110 can obtain a three-dimensional mesh from the client device 106 or from another system (e.g., a database of three-dimensional models). The three-dimensional modeling system 110 can then use the mesh decimation system 102 to decimate the three-dimensional mesh. By decimating a three-dimensional mesh, the mesh decimation system 102 can modify a fine three-dimensional mesh by adding removing vertices in one or more decimation iterations to generate a coarse three-dimensional mesh with a bijective map between the fine three-dimensional mesh and the coarse three-dimensional mesh. For example, in one or more embodiments, the mesh decimation system 102 can determine that the client device 106 has limitations in graphics hardware that prevents the ability to effectively render a fine three-dimensional mesh. In response, the mesh decimation system 102 can decimate the fine three-dimensional mesh to produce a decimated mesh that the client device 106 is configured to render or otherwise manipulate.

In one or more embodiments, after decimating the three-dimensional mesh using the mesh decimation system 102, the three-dimensional modeling system 110 can provide the decimated mesh to the client device 106 via the network 108. For example, the three-dimensional modeling system 110 can provide the decimated mesh for rendering at the client device 106 on a display device using the client application 112. In one or more embodiments, the mesh decimation system 102 can determine that the network 108 has data transfer limitations (e.g., low available bandwidth) that will cause undesirable delays in the transfer of the three-dimensional mesh to the client device 106 via the network 108. In response, the mesh decimation system 102 can decimate the three-dimensional mesh to produce a decimated mesh that can be transferred to the client device 106 over the network 108 in a timely fashion.

Additionally, the client application 112 can include a digital content editing application (e.g., a three-dimensional modeling application) that provides tools for viewing, generating, editing, or otherwise interacting with three-dimensional meshes. The client device 106 can thus present a decimated three-dimensional mesh within the client application 112 to allow a user to view, edit, or otherwise interact with the decimated three-dimensional mesh. In particular, as previously mentioned, reducing the resolution of a three-dimensional mesh can increase the speed and efficiency of rendering the mesh to provide a fast preview of the rendered mesh. The mesh decimation system 102 can additionally provide adaptive decimation for a variety of three-dimensional environment applications, such as by providing different levels of decimation of a high-resolution three-dimensional mesh to computing devices based on the capabilities of the individual computing devices. Indeed, the mesh decimation system 102 can provide different levels of detail versions three dimensional models/scenes as part of real-time streaming of three-dimensional models to the client device 106 as part of a virtual reality experience, terrain modeling, or scientific visualizations.

In one or more additional embodiments, the three-dimensional modeling system 110 (or the mesh decimation system 102) can use the decimated three-dimensional mesh to train one or more neural networks. For example, the three-dimensional modeling system 110 can use the input mesh (e.g., a high-resolution three-dimensional mesh) and a decimated mesh (e.g., a low-resolution three-dimensional mesh) to learn parameters of a mesh subdivision neural network. The mesh subdivision neural network may be part of the three-dimensional modeling system 110 or part of another system (e.g., a system external to the server device(s) 104).

In addition, as shown in FIG. 1, the system environment 100 includes the client device 106. The client device 106 can include, but is not limited to, a mobile device (e.g., smartphone or tablet), a laptop, a desktop, including those explained below with reference to FIG. 10. Furthermore, although not shown in FIG. 1, the client device 106 can be operated by a user (e.g., a user included in, or associated with, the system environment 100) to perform a variety of functions. In particular, the client device 106 can perform functions such as, but not limited to, accessing, viewing, and interacting with a variety of digital content (e.g., three-dimensional imaging environments, virtual/augmented reality environments). The client device 106 can also perform functions for generating, capturing, or accessing data to provide to the three-dimensional modeling system 110 and the mesh decimation system 102 in connection with virtual/augmented reality environments. For example, the client device 106 can communicate with the server device(s) 104 via the network 108 to provide information associated with three-meshes and three-dimensional environments. Although FIG. 1 illustrates the system environment 100 with a single client device 106, the system environment 100 can include a different number of client devices.

In one or more embodiments, the server device(s) 104 include a variety of computing devices, including those described below with reference to FIG. 10. For example, the server device(s) 104 can include one or more servers for storing and processing data associated with three-dimensional imaging applications. The server device(s) 104 can also include a plurality of computing devices in communication with each other, such as in a distributed storage environment. Furthermore, the server device(s) 104 can include devices and/or components in connection with one or more neural network(s) and training data for training the neural network(s). In some embodiments, the server device(s) 104 comprise a content server. The server device(s) 104 can also comprise an application server, a communication server, a web-hosting server, a social networking server, a digital content campaign server, or a digital communication management server.

Additionally, as shown in FIG. 1, the system environment 100 includes the network 108. The network 108 can enable communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 10.

Although FIG. 1 illustrates the server device(s) 104 and the client device 106 communicating via the network 108, the various components of the mesh decimation system 102 can communicate and/or interact via other methods (e.g., the server device(s) 104 and the client device 106 can communicate directly). Furthermore, although FIG. 1 illustrates the mesh decimation system 102 being implemented by a particular component and/or device within the system environment 100, the mesh decimation system 102 can be implemented, in whole or in part, by other computing devices and/or components in the system environment 100 (e.g., the client device 106).

Figure 2A:
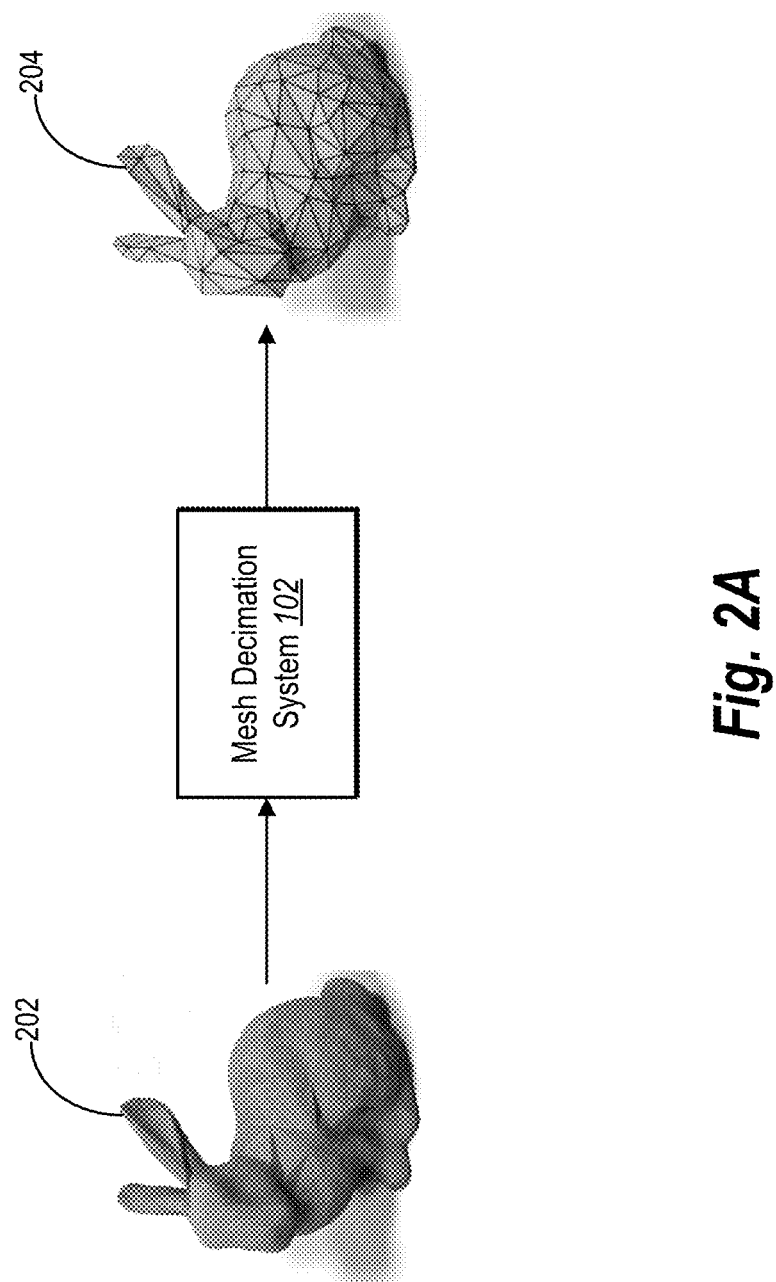
FIGS. 2A-2B illustrate diagrams of a process overview for decimating a three-dimensional mesh to create a coarse three-dimensional mesh in accordance with one or more implementations.
Figure 2B:
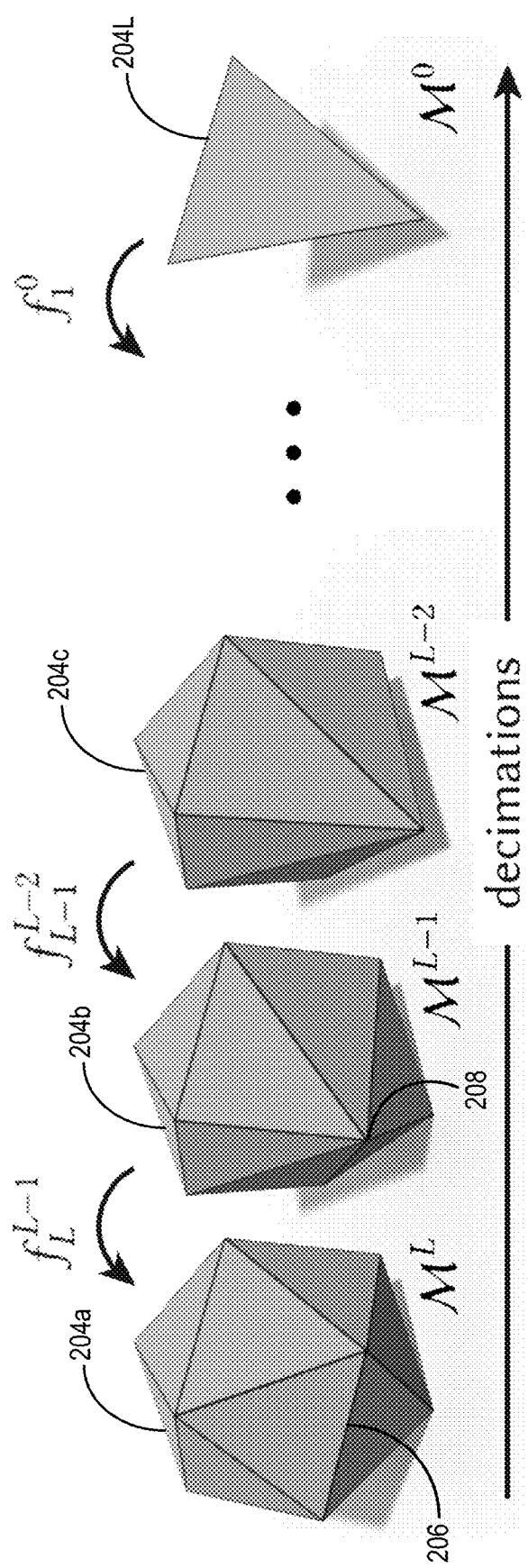

As mentioned above, the mesh decimation system 102 can accurately decimate three-dimensional meshes in any number of decimation iterations while maintaining a bijective map across the decimated three-dimensional meshes. FIGS. 2A-2B illustrate an overview of a process for decimating a three-dimensional mesh. Specifically, FIG. 2A illustrates that the mesh decimation system 102 can receive a three-dimensional mesh as an input and then generate a decimated three-dimensional mesh. FIG. 2B illustrates that the mesh decimation system 102 performs a plurality of mesh decimation operations on a three-dimensional mesh to create a bijective map between an input mesh and an output mesh.

FIG. 2A illustrates that the mesh decimation system 102 can receive a three-dimensional mesh 200 as an input. According to one or more embodiments, the three-dimensional mesh 200 can include a high-resolution three-dimensional mesh. For example, the three-dimensional mesh 200 can include a mesh that includes a plurality of vertices that form faces on one or more surfaces to represent an object or a scene. For example, the three-dimensional mesh 200 is a three-dimensional triangular mesh including a plurality of triangular faces. In one or more embodiments, the three-dimensional mesh 200 can be a mesh generated by a user. Alternatively, the three-dimensional mesh 200 can include a mesh obtained by a user from a database of three-dimensional models or from another source.

The mesh decimation system 102 can generate a decimated three-dimensional mesh 202 from the three-dimensional mesh 200. In particular, the mesh decimation system 102 can iteratively perform one or more mesh decimation operations on the three-dimensional mesh 200, resulting in the decimated three-dimensional mesh 202. More specifically, the mesh decimation system 102 can decimate the three-dimensional mesh 200 by collapsing edges and removing vertices from the three-dimensional mesh 200. By removing vertices from the mesh, the mesh decimation system 102 can reduce the resolution of the three-dimensional mesh 200 to create the decimated three-dimensional mesh 202 while approximating the same underlying smooth surface as the three-dimensional mesh 200.

Additionally, when generating the decimated three-dimensional mesh 202, the mesh decimation system 102 can create a bijective map between the three-dimensional mesh 200 and the decimated three-dimensional mesh 202. Specifically, the mesh decimation system 102 can create dense correspondences between the three-dimensional mesh 200 and the decimated three-dimensional mesh according to the intrinsic geometry of the underlying surface. The mesh decimation system utilizes successive self-parameterization of the three-dimensional mesh 200 during the decimation operations to ensure that the correspondences between the three-dimensional mesh 200 and the decimated three-dimensional mesh 202 result in an accurate bijective map.

FIG. 2B illustrates an overview of the process for generating a bijective map between the three-dimensional mesh 200 and the decimated three-dimensional mesh 202. In particular, FIG. 2B illustrates a that the mesh decimation system 102 can perform a plurality of mesh decimations on a three-dimensional triangle mesh 204a. As shown, the mesh decimation system 102 can generate a plurality of successively decimated three-dimensional meshes (e.g., three-dimensional triangle meshes 204b-204L) after each decimation iteration. During each decimation iteration, the mesh decimation system 102 can collapse one or more edges (e.g., by combining vertices that form an edge to create a new vertex).

In one or more embodiments, the mesh decimation system 102 can process the three-dimensional triangle mesh 204a to collapse an edge 206 to create a single vertex 208. As a result of collapsing the edge 206, the mesh decimation system 102 can generate a first decimated three-dimensional triangle mesh (or simply "first decimated mesh 204b"). The mesh decimation system 102 can continue collapsing edges in successive decimation iterations, generating a new decimated three-dimensional triangle mesh at each iteration (e.g., decimated meshes 204c-204L) until the mesh decimation system has finished collapsing edges. After completing the decimation iterations for decimating the three-dimensional triangle mesh 204a, the mesh decimation system 102 can generate a final decimated three-dimensional triangle mesh (e.g., decimated mesh 204L).

As illustrated in FIG. 2B, the mesh decimation system 102 can also determine a bijective map for each decimation iteration. In one or more embodiments, the mesh decimation system 102 determines a bijective map for a decimated mesh by comparing the decimated mesh to a three-dimensional mesh at a previous decimation level. To illustrate, in connection with generating the first decimated mesh 204b, the mesh decimation system 102 can determine a bijective map that maps points in the first decimation mesh 204b to points in the three-dimensional triangle mesh 204a with one-to-one correspondences. Additionally, in connection with generating a second decimated mesh 204c, the mesh decimation system 102 can determine a bijective map that maps points in the second decimated mesh 204c to points in the first decimated mesh 204b with one-to-one correspondences. The mesh decimation system 102 can thus continue determining bijective maps for each decimation iteration. The mesh decimation system 102 can then determine a final bijective map by combining the bijective maps corresponding to the plurality of decimation iterations that maps the final decimated mesh 204L back to the three-dimensional triangle mesh 204a via any intervening meshes and their corresponding bijective maps.

In particular, in one or more embodiments, the mesh decimation system 102 can process an input triangle mesh $\mathcal{M}^L=(V^L, F^L)$, where $V^L$, $F^L$ are vertex positions and face information, respectively, at the origin level L. The mesh decimation system 102 can successively decimate the input mesh $\mathcal{M}^L$ into a series of meshes $\mathcal{M}^l=(V^l, F^l)$ with 0≤l≤L, where $\mathcal{M}^0=(V^0, F^0)$ is the coarsest mesh (i.e., the mesh with the fewest vertices). For each edge collapse operation to decimate a mesh $\mathcal{M}^l \rightarrow \mathcal{M}^{l-1}$, as illustrated in FIG. 2B, the mesh decimation system can determine the bijective map $f_l^{l-1}: \mathcal{M}^{l-1} \rightarrow \mathcal{M}^l$ in conjunction with performing the edge collapse operation. Furthermore, the mesh decimation system 102 can determine the final bijective map $f_L^0: \mathcal{M}^0 \rightarrow \mathcal{M}^L$ indicating the bijective correspondences from the coarsest mesh $\mathcal{M}^0$ to the input mesh $\mathcal{M}^L$ as $f_L^0 = F_L^{L-1} \infty \ldots \infty f_1^0$.

Figure 3A:
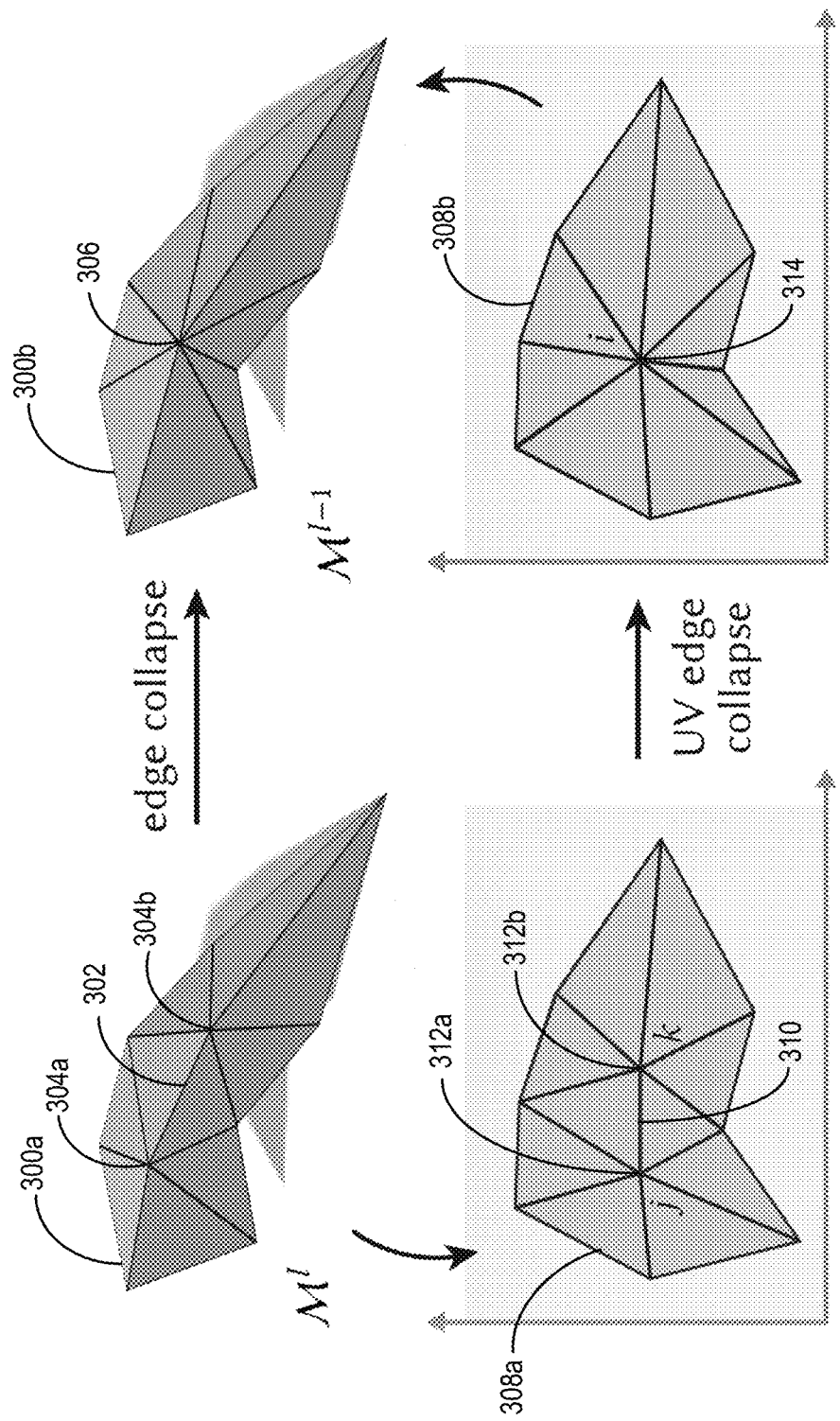
FIGS. 3A-3B illustrate diagrams of a process overview for collapsing an edge in a three-dimensional mesh and a corresponding edge in a two-dimensional surface mapping space in accordance with one or more implementations.
Figure 3B:
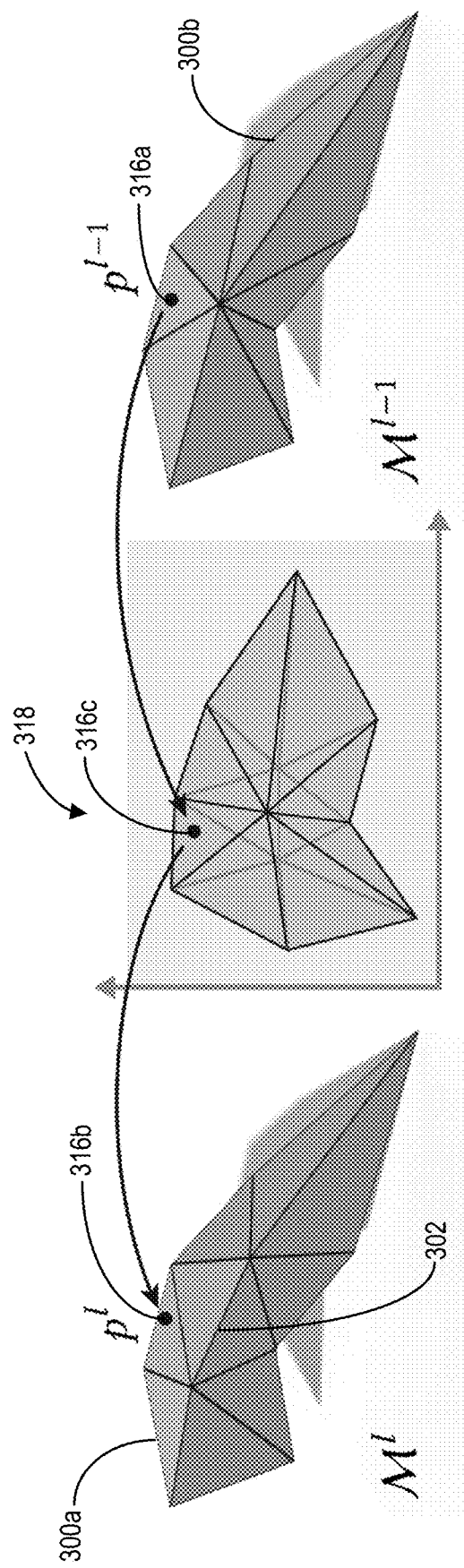

When decimating a three-dimensional mesh to create a coarser mesh, the mesh decimation system 102 can perform a plurality of edge collapses across a surface of the three-dimensional mesh. FIGS. 3A-3B illustrate an overview of a process for collapsing edges in the three-dimensional mesh while performing self-parameterization from the three-dimensional mesh to the decimated three-dimensional mesh. Specifically, FIG. 3A illustrates a process for self-parameterization of a local geometry of an edge collapse via a surface mapping associated with the local geometry. FIG. 3B illustrates that the mesh decimation system 102 utilizes the self-parameterization of the geometry to provide correspondences between the three-dimensional mesh and the decimated three-dimensional mesh.

FIG. 3A illustrates that the mesh decimation system 102 can determine a local geometry 300a for performing an edge-collapse operation in a three-dimensional mesh. In one or more embodiments, the local geometry 300a includes a 1-ring neighborhood of vertices surrounding an edge 302 to be collapsed within a three-dimensional environment. In particular, FIG. 3A illustrates that the edge 302 is formed by a first vertex 304a and a second vertex 304b. The mesh decimation system 102 can thus determine local geometry 300a by including vertices that are directly connected to the first vertex 304a or the second vertex 304b via a plurality of additional edges in a single "ring" around the edge 302.

The mesh decimation system 102 can collapse the edge 302 by combining the first vertex 304a and the second vertex 304b to create a new vertex 306. For example, the mesh decimation system 102 can utilize an edge-collapse algorithm that combines the first vertex 304a and the second vertex 304b to create the new vertex 306 at a midpoint of the edge 302. Alternatively, the mesh decimation system 102 can utilize an edge-collapse algorithm that generates the new vertex 306 at another position on or near the edge 302.

By collapsing the edge 302 to generate the new vertex 306, the mesh decimation system 102 can generate a decimated local geometry 300b. In particular, the decimated local geometry 300b can include a 1-ring neighborhood of vertices connected directly to the new vertex 306 via a plurality of edges in a single "ring" around the new vertex 306. In one or more embodiments, as illustrated in FIG. 3A, the local geometry 300a and the decimated local geometry 300b have the same boundary shape. In other words, the mesh decimation system 102 may keep the positions of other vertices in the 1-ring neighborhood (i.e., vertices other than the first vertex 304a and the second vertex 304b) consistent before and after utilizing the edge-collapse algorithm to generate the new vertex 306. Accordingly, the vertices that form the 1-ring neighborhood for the edge 302 also form the 1-ring neighborhood for the new vertex 306.

As mentioned, the mesh decimation system 102 can map the three-dimensional mesh to a two-dimensional surface mapping space. FIG. 3B illustrates that the mesh decimation system determines a surface mapping between the vertices in the local geometry 300a of the edge 302 and a surface mapping space (e.g., a UV space). The mesh decimation system 102 can thus determine a local surface mapping geometry 308a for a corresponding edge 310 in the surface mapping space. As shown in FIG. 3A, the local surface mapping geometry 308a includes a plurality of vertices connected via edges in a 1-ring neighborhood for the corresponding edge 310. Each of the vertices in the local surface mapping geometry 308a has two-dimensional coordinates in the surface mapping space and is connected to one or more other vertices in a manner consistent with the local geometry 300a in the three-dimensional mesh (e.g., vertices and edges in the surface mapping space are connected in the same manner as the respective vertices and edges in the three-dimensional mesh).

In one or more embodiments, the mesh decimation system 102 also uses conformal flattening to determine the surface mapping between the vertices in the local geometry 300a in the three-dimensional mesh and the local surface mapping geometry 308a in the surface mapping space. In particular, the mesh decimation system 102 can process the conformal geometry of the local geometry 300a to preserve information about the relationships between vertices when mapping the vertices of the local geometry 300a to the surface mapping space. For example, the mesh decimation system can utilize conformal parameterization as described in "Spectral conformal parameterization" by Patrick Mullen, Yiying Tong, Pierre Alliez, and Mathie Desbrun in Computer Graphics Forum, Vol. 27 in 2008, hereby incorporated by reference in its entirety. By utilizing conformal flattening to determine the surface mapping, the mesh decimation system 102 can minimize angle distortion that would otherwise accumulate through successive parameterizations without conformal flattening. The mesh decimation system 102 can thus limit or eliminate distortion and skewed correspondences, which is especially important in generating training data for learning parameters of neural networks (e.g. a mesh subdivision neural network).

FIG. 3A also illustrates that the mesh decimation system 102 collapses the corresponding edge 310 in the two-dimensional surface mapping space. Specifically, the mesh decimation system 102 can collapse the corresponding edge 310 by combining a first corresponding vertex 312a (corresponding to the first vertex 304a) and a second corresponding vertex 312b (corresponding to the second vertex 304b) to generate a new corresponding vertex 314 in the surface mapping space. The new corresponding vertex 314 in the surface mapping space corresponds to the new vertex 306 in a decimated local surface mapping geometry 308b. In one or more embodiments, the mesh decimation system 102 can collapse the corresponding edge 310 in the surface mapping space at approximately the same time as collapsing the edge 302 in the three-dimensional mesh.

In addition to collapsing the edge in the surface mapping space, the mesh decimation system 102 can preserve the vertices in the 1-ring neighborhood after the edge collapse in the surface mapping space. For instance, the mesh decimation system 102 can constrain a boundary of the vertices in the local surface mapping geometry 308a to a fixed boundary shape before and after collapsing the corresponding edge 310 in the surface mapping space. Accordingly, in one or more embodiments, the mesh decimation system 102 preserves the boundary shapes of the 1-ring neighborhood in the three-dimensional mesh and the corresponding 1-ring neighborhood in the surface mapping space before and after collapsing the edge and corresponding edge, respectively. To illustrate, the mesh decimation system 102 can perform an additional conformal flattening operation on the decimated local geometry 300b in the three-dimensional mesh (i.e., after collapsing the edge 302) to generate the decimated local surface mapping geometry 308b while constraining the boundary shape of the decimated local surface mapping geometry 308b to the boundary shape of the local surface mapping geometry 308a.

By performing successive conformal flattening operations with fixed boundary on the local geometry 300a and the decimated local geometry 300b (e.g., before and after collapsing the edge 302), the mesh decimation system 102 provides a bijective map for the local geometry 300a. FIG. 3B illustrates that the mesh decimation system 102 can provide a bijective map via self-parameterization of a three-dimensional mesh before and after decimation of the three-dimensional mesh. Specifically, the mesh decimation system 102 provides the bijective map including one-to-one correspondences of points from the decimated local geometry 300b after decimation to the local geometry 300a prior to decimation. In other words, for each point in the decimated local geometry 300b, the bijective map includes a correspondence to one point in the local geometry 300a.

To illustrate, FIG. 3B illustrates that a point 316a in the decimated local geometry 300b corresponds to a point 316b in the local geometry 300a prior to decimation. In one or more embodiments, the corresponding points (point 316a, point 316b) are corresponding barycentric points in the decimated local geometry 300b and the local geometry 300a, respectively. The mesh decimation system 102 can utilize a shared parameterization 318 that includes the surface mapping in the surface mapping space before and after collapsing the edge 302. As shown, because the shared parameterization 318 includes surface mapping of vertices in the three-dimensional mesh before and after collapsing an edge, the shared parameterization 318 can also include a point 316c that provides the one-to-one correspondence between the point 316a in the decimated local geometry 300b and the point 316b in the local geometry 300a.

Although FIGS. 3A-3B illustrate that the mesh decimation system 102 can decimate a local geometry by collapsing a single edge, the mesh decimation system 102 can decimate a plurality of local geometries by collapsing a plurality of edges across a three-dimensional mesh. In one or more embodiments, the mesh decimation system 102 can utilize an edge-decimation algorithm that selects edges across the surface of the three-dimensional model to decimate for each decimation operation. To illustrate, the mesh decimation system 102 can utilize a QSLIM edge-collapse algorithm as described in "Surface simplification using quadric error metrics" by Michael Garland and Paul S. Heckbert in "Proceedings of the 24$^{th}$ annual conference on Computer graphics and interactive techniques" in 1997, hereby incorporated by reference in its entirety. Alternatively, the mesh decimation system 102 can use any edge-collapse algorithm such as random edge collapses. In any case, the mesh decimation system 102 utilizes successive self-parameterization to provide a bijective map between a decimated three-dimensional mesh and an input three-dimensional mesh.

Furthermore, while FIGS. 3A-3B illustrate that the mesh decimation system 102 provides a bijective map for a single local geometry across a single decimation iteration, the mesh decimation system 102 can provide a bijective map for a plurality of local geometries across an entire three-dimensional mesh. In particular, the mesh decimation system 102 can perform a plurality of edge collapses across an entire three-dimensional mesh. For each edge collapse, the mesh decimation system 102 can perform a self-parameterization process to determine a bijective map, as described in FIGS. 3A-3B. Because each of the local geometries has a bijective map across the decimation iteration, the mesh decimation system 102 can also provide a bijective map for the entire three-dimensional mesh across the decimation iteration.

FIGS. 3A-3B illustrate a specific example of an edge collapse process. More generally, the mesh decimation system 102 identifies a 1-ring neighborhood of vertices for a vertex i as $\mathcal{N}$ (i). Additionally, $\mathcal{N}$ (j,k)=$\mathcal{N}$ (j)∪$\mathcal{N}$ (k) denotes the neighboring vertices (e.g., 1-ring neighborhood) of an edge (j,k). After each edge collapse, the mesh decimation system can determine the bijective map for the corresponding edge's 1-ring neighborhood $\mathcal{N}$ (j,k) in two stages. First, the mesh decimation system 102 can parameterize the neighborhood $\mathcal{N}$ (j,k) (prior to the edge collapse) into the two-dimensional surface mapping space. The mesh decimation system 102 can then perform the edge collapse in the three-dimensional mesh and in the surface mapping space. As noted, the boundary vertices of $\mathcal{N}$ (j,k) before the collapse become the boundary vertices of $\mathcal{N}$ (i) after the collapse. Accordingly, the parameterization of the neighborhood remains valid and injective after the edge collapse. Then, for any given point $p^{i-1} \in \mathcal{M}^{i-1}$ (represented in barycentric coordinates), the mesh decimation system 102 can utilize the shared parameterization to map $p^{i-1}$ to its corresponding barycentric point $p^i \in \mathcal{M}^i$ and vice-versa.

The mesh decimation system 102 can use conformal flattening to determine the surface mapping of the 1-ring neighborhoods. In particular, the mesh decimation system 102 can perform two local conformal parameterizations to the chosen edge collapse algorithm to incorporate successive self-parameterization. For example, to collapse the edge (j,k), the mesh decimation system 102 first flattens the edge's 1-ring neighborhood $\mathcal{N}$ (j,k) before collapsing the edge. After collapsing the edge and inserting a new vertex $v \in \mathbb{R}^3$, the mesh decimation system 102 can determine the vertex's location in the surface mapping space by performing another conformal flattening on the 1-ring neighborhood $\mathcal{N}$ (i) of the newly inserted vertex i, with the boundary held to place from the previous flattening operation. The mesh decimation system 102 can thus yield a bijective map with low computational cost because each flattening operation involves only one 1-ring neighborhood (assuming vertex valence is bounded). In one or more embodiments, the edge-collapse algorithm can take O(N log N), and the conformal flattening can be a constant cost on top of the edge-collapse algorithm, such that the complexity of the full algorithm containing both edge collapses and successive self-parameterization with conformal flattening is still O(N log N).

Additionally, in one or more embodiments, the robustness of the self-parameterization process relies on the robustness of the underlying edge-collapse algorithm. Specifically, edge collapses that may lead to self-intersections and unusable parameterization maps. Accordingly, the mesh decimation system 102 can perform an edge validity check to determine whether to collapse a given edge. For instance, the mesh decimation system 102 can perform validity checks to ensure that errors such as flipped faces and non-manifold edges do not occur in the three-dimensional mesh.

To illustrate, in one or more embodiments, the mesh decimation system 102 can check for Euclidean face flips. More particularly, certain faces in the Euclidean space may suffer from normal flips after an edge collapse. To prevent flipped faces, the mesh decimation system 102 can compare the unit face normal n̂ of each neighboring face $f_i$ before and after the edge collapse as $\hat{n}_{f_i}^{before} \cdot \hat{n}_{f_i}^{after} > \delta$. In one or more embodiments, the mesh decimation system 102 can utilize $\delta > 0.2$ to avoid flipped faces, though other embodiments may use other values of $\delta$.

In one or more embodiments, the mesh decimation system 102 can prevent flipped faces in the surface mapping space. Specifically, flipped faces in the UV space may be due too conformal flattening and/or the edge collapse. The mesh decimation system 102 can check for flipped faces in the surface mapping space by determining whether the signed area of each face in the surface mapping space is positive before and after collapses.

Additionally, the mesh decimation system 102 can perform a check for overlapping faces in the surface mapping space. In particular, even if the faces in the UV space may still overlap with each other depending on the type of conformal flattening algorithm that the mesh decimation system 102 employs. The mesh decimation system 102 can determine whether the total angle sum of each interior vertex in the 1-ring neighborhood is $2\pi$ to determine the validity of an edge collapse.

In one or more additional embodiments, the mesh decimation system 102 can prevent the appearance of non-manifold edges in the three-dimensional mesh after an edge collapse. For instance, the mesh decimation system 102 can check for "link conditions" as described in "Topology preserving edge contraction" by Tamal K. Dey, Herbert Edelsbrunner, Sumanta Guha, and Dmitry V. Nekhayev in 1999, hereby incorporated by reference in its entirety. More specifically, if an edge $e_{ij}$ connecting vertices i, j is valid, the intersection between the vertex 1-ring neighborhood of i and the vertex 1-ring neighborhood of j must contain only two vertices, and the two vertices cannot be an edge.

In one or more embodiments, the mesh decimation system 102 can also prevent poorly shaped faces (e.g., skinny triangles) from causing numerical issues. Specifically, the mesh decimation system 102 can track triangle quality for each edge collapse as measured by:

$$Q_{ijk} = \frac{4\sqrt{3} A_{ijk}}{l_{ij}^2 + l_{jk}^2 + l_{ki}^2}$$

where A is the area of the triangle and l are the lengths of triangle edges. When $Q \to 1$, the triangle approaches a unilateral triangle; when $Q \to 0$, the triangle approaches a skinny, degenerated triangle. For each edge, the mesh decimation system 102 can check Q for all the neighboring faces in the Euclidean domain and the surface mapping space after the collapse. In one or more embodiments, the default parameter of a valid edge can set $Q > 0.2$ for all neighboring triangles.

Figure 4A:
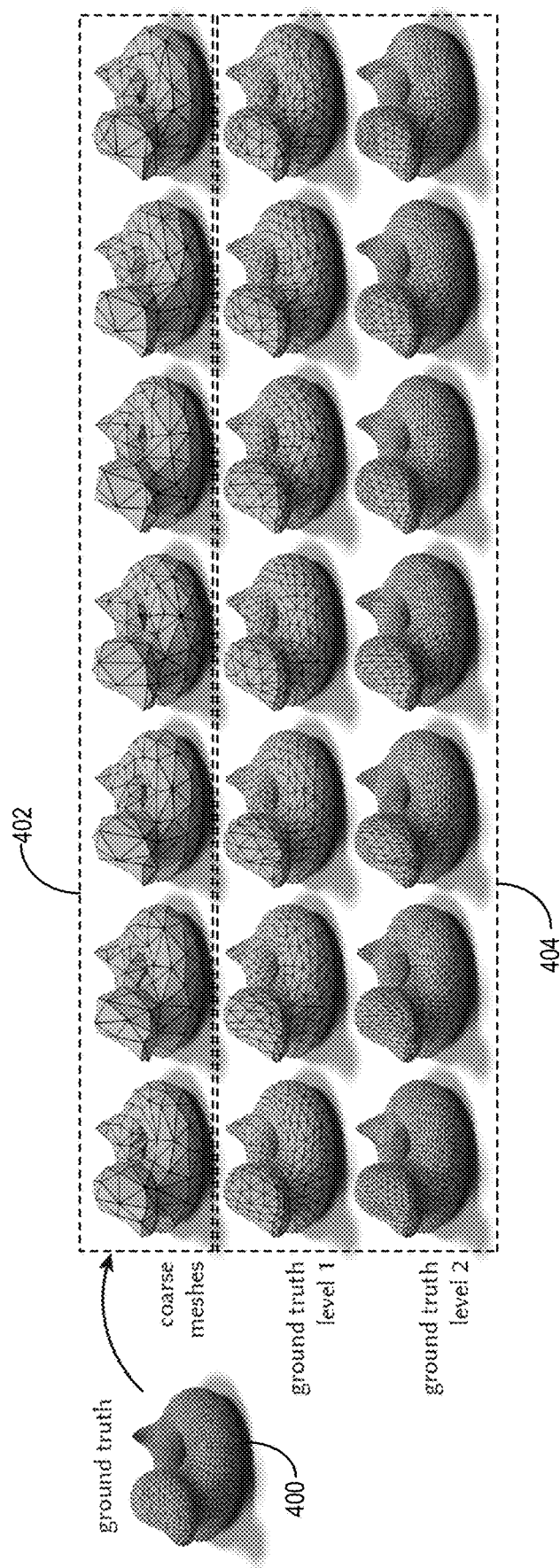
FIG. 4A illustrates a diagram of a process for generating a plurality of different coarse three-dimensional meshes from a three-dimensional mesh in accordance with one or more implementations.
Figure 4B:
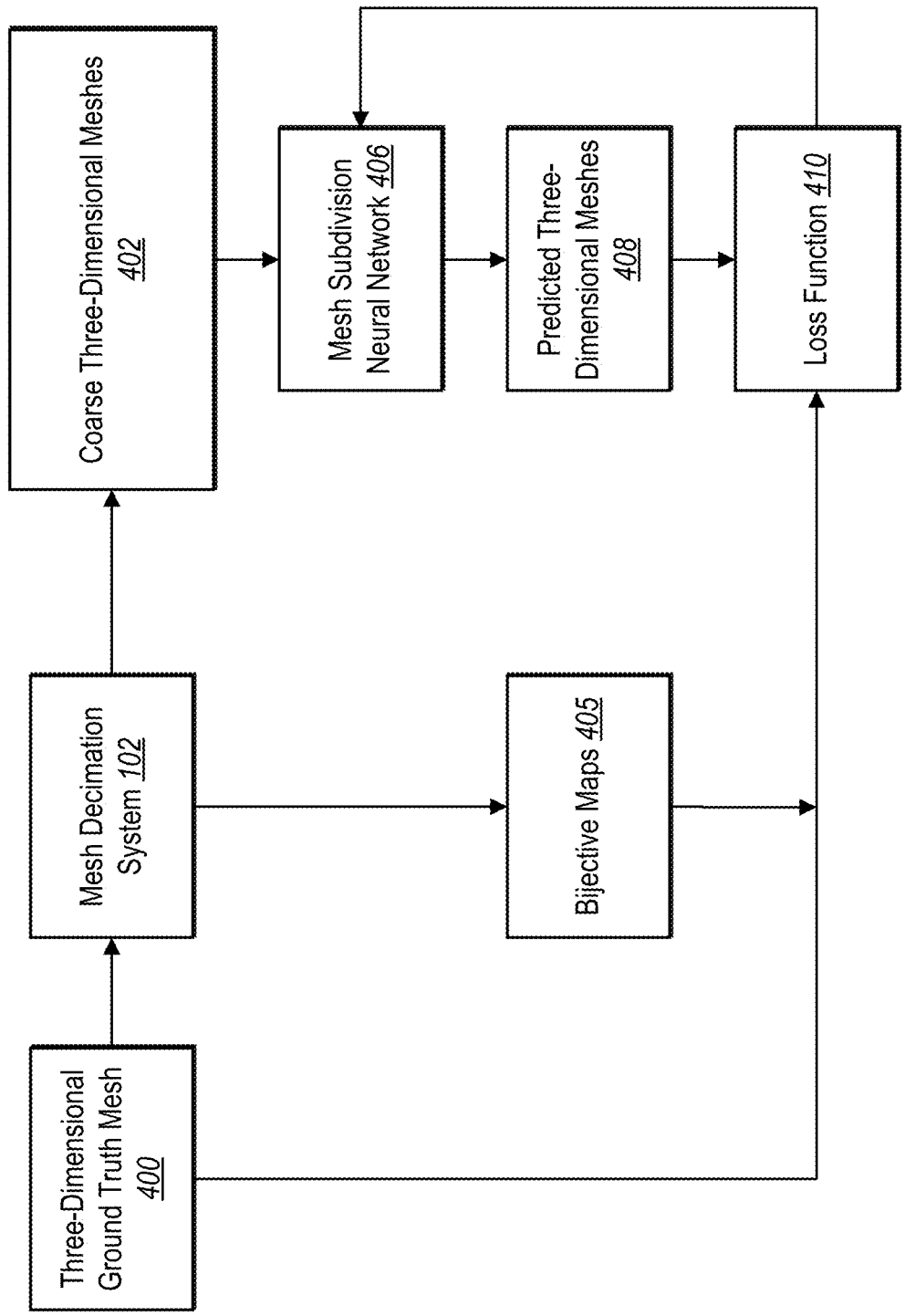
FIG. 4B illustrates a diagram of a process for utilizing decimated three-dimensional meshes to learn parameters of a mesh subdivision neural network in accordance with one or more implementations.

As mentioned previously, the mesh decimation system 102 can utilize a plurality of decimation iterations resulting in bijective maps to generate training data for learning parameters of a neural network. FIGS. 4A-4B illustrate processes for generating training data and then learning parameters of a mesh subdivision neural network using the training data. In particular, FIG. 4A illustrates an overview of a process for generating a plurality of different decimated three-dimensional meshes from a single input three-dimensional mesh. FIG. 4B illustrates an overview of a process for learning parameters of a neural network by utilizing coarse/fine pairs of three-dimensional meshes.

FIG. 4A illustrates that the mesh decimation system 102 can generate a plurality of fine and coarse three-dimensional mesh pairs to use in training a neural network. Specifically, FIG. 4A illustrates that the mesh decimation system 102 can process a single high-resolution three-dimensional mesh to generate a plurality of different low-resolution three-dimensional meshes to create a training dataset of meshes. For instance, as illustrated in FIG. 4A, the mesh decimation system 102 can decimate a ground truth three-dimensional mesh 400 to generate a plurality of coarse three-dimensional meshes 402 with different vertices, but with approximately the same general shape. In one or more embodiments, the mesh decimation system 102 can utilize a QSLIM edge-collapse algorithm, as mentioned previously, with a random sequence of edge collapses to construct the plurality of different coarse three-dimensional meshes 402 from the ground truth three-dimensional mesh 400.

Furthermore, in one or more embodiments, the mesh decimation system 102 can obtain sets of ground truth three-dimensional meshes 404 at different levels of decimation. In particular, the mesh decimation system 102 can perform a plurality of decimation iterations on the ground truth three-dimensional mesh 400 using the random sequence of edge collapses while obtaining decimated three-dimensional meshes at each decimation iteration. The mesh decimation system 102 can also utilize successive self-parameterization with the edge-collapse operations to obtain high-quality bijective maps to map the one-to-one vertex correspondences from the coarse three-dimensional meshes 402 back to the ground truth three-dimensional mesh 400 via the intermediate sets of ground truth three-dimensional meshes 404. In one or more embodiments, the mesh decimation system 102 can select, as a pair of fine/coarse three-dimensional meshes, a given coarse three-dimensional mesh and a fine three-dimensional mesh selected from the ground truth three-dimensional mesh 400 or any one of the intermediate decimated three-dimensional meshes in the sets of ground truth three-dimensional meshes 404.

FIG. 4B illustrates an embodiment of a training process for learning parameters of a neural network for subdividing three-dimensional meshes. Specifically, the mesh decimation system 102 can decimate a three-dimensional mesh to generate one or more coarse three-dimensional meshes. For example, the mesh decimation system 102 can process the ground truth three-dimensional mesh 400 to generate the coarse three-dimensional meshes 402.

The mesh decimation system 102 can provide the coarse three-dimensional meshes 402 to a mesh subdivision neural network 406. The mesh subdivision neural network 406 can include a neural network that can process a three-dimensional mesh to automatically subdivide the three-dimensional mesh. For instance, the mesh subdivision neural network 406 can process a three-dimensional mesh to insert new vertices into the three-dimensional mesh. In one or more embodiments, the mesh subdivision neural network 406 can output predicted three-dimensional meshes 408 that include higher-resolution versions of the coarse three-dimensional meshes 402 (e.g., the predicted three-dimensional meshes 408 have more vertices due to subdividing the coarse three-dimensional meshes 402 in one or more subdivision iterations). The mesh decimation system 102 can also determine bijective maps 405 indicating one-to-one correspondences between the ground truth three-dimensional mesh 400 and the coarse three-dimensional meshes 402.

The mesh decimation system 102 (or another system such as the three-dimensional modeling system 110 of FIG. 1) can then verify the accuracy of the predicted three-dimensional meshes 408. For instance, the mesh decimation system 102 can compare the predicted three-dimensional meshes 408 to the ground truth three-dimensional mesh 400. Additionally, in one or more embodiments, the mesh decimation system 102 can compare a predicted three-dimensional mesh at each level of subdivision iteration to a corresponding level of ground truth three-dimensional mesh generated by the mesh decimation system 102. To illustrate, the mesh decimation system 102 can use the bijective maps 405 to compare a plurality of predicted three-dimensional meshes at a plurality of different subdivision iterations of the mesh subdivision neural network 406 to a plurality of ground truth three-dimensional meshes in the sets of ground truth three-dimensional meshes 404.

By comparing the output(s) of the mesh subdivision neural network 406 at one or more levels of subdivision to ground truth meshes, the mesh decimation system 102 can determine a loss function 410 representing the difference between the output(s) and ground truth. For instance, the mesh decimation system 102 can use the bijective maps 405 to retrieve one-to-one correspondences to the input shape (e.g., using barycentric coordinates of points in a coarse mesh b to obtain barycentric coordinates in a fine mesh f(b). The mesh decimation system 102 can then use the output position $\mathcal{E}(b)$, where $\mathcal{E}$ represents the mesh subdivision neural network 406 to measure the loss $\|f(b) - \mathcal{E}(b)\|_2$. After obtaining the one-to-one correspondences, the mesh decimation system 102 can use the point-wise $\ell^2$ norm as the loss function 410 for learning parameters of the mesh subdivision neural network 406. To illustrate, the mesh decimation system 102 can utilize back propagation based on losses across separate subdivided iterations from the mesh subdivision neural network 406 to update/learn the parameters of the mesh subdivision neural network 406.

Figure 5:
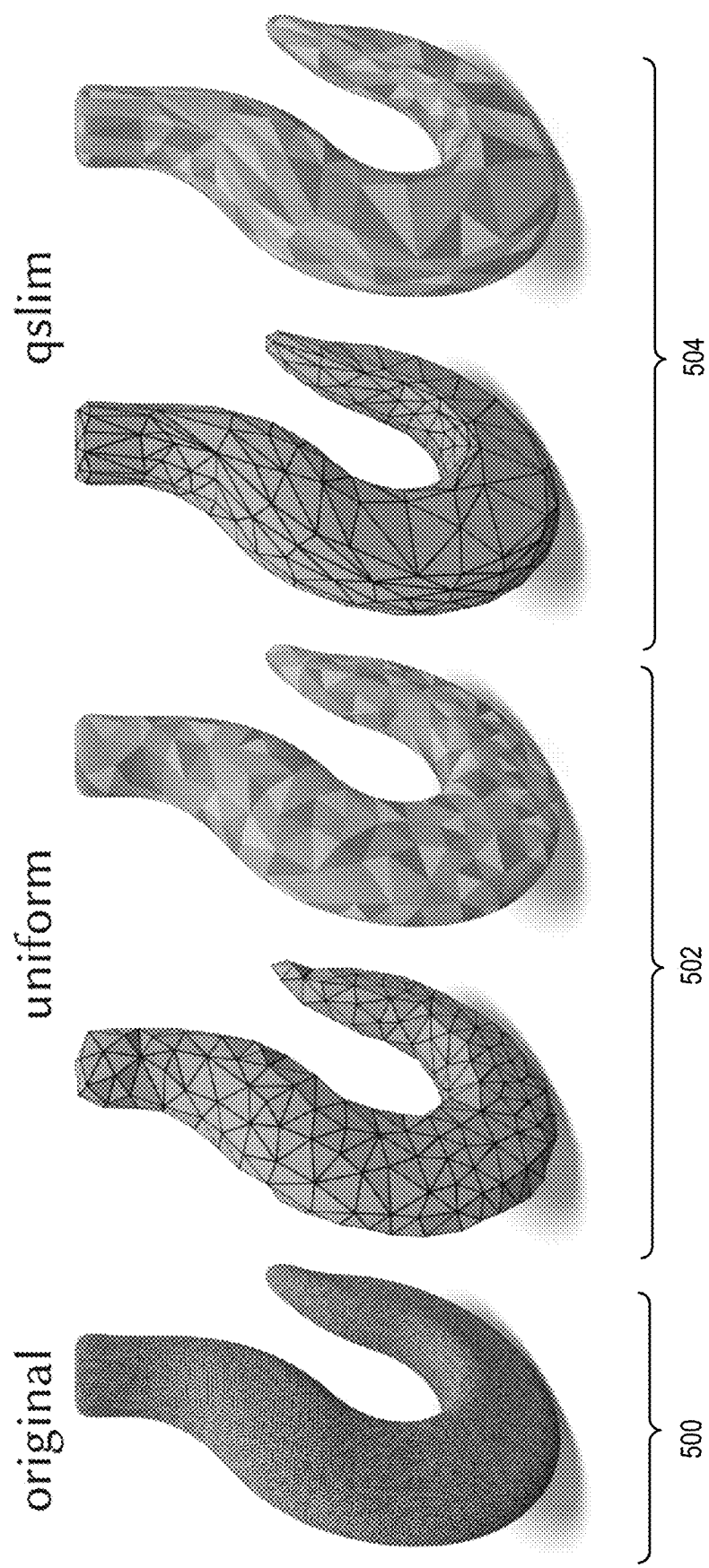
FIG. 5 illustrates a diagram of a plurality of decimated three-dimensional meshes generated utilizing various edge-collapse algorithms on a three-dimensional mesh in accordance with one or more implementations.

As noted previously, the mesh decimation system 102 can utilize any edge-collapse algorithm to decimate a three-dimensional mesh. FIG. 5 illustrates that the mesh decimation system 102 can apply different edge-collapse algorithms to a three-dimensional mesh 500 to achieve different decimation results (e.g., decimated meshes with diverse types of discretizations). For instance, the mesh decimation system 102 can utilize an edge-collapse algorithm that performs uniform-area parameterization to obtain a first decimated three-dimensional mesh 502. Alternatively, the mesh decimation system 102 can utilize an edge-collapse algorithm that performs appearance-preserving parameterization (e.g., QSLIM) to obtain a second decimated three-dimensional mesh 504. As illustrated, because the mesh decimation system 102 utilizes successive self-parameterization in connection with the chosen edge-collapse algorithm, the mesh decimation system 102 provides flexibility by allowing the use of any edge-collapse algorithm while still providing a bijective map between the input mesh and the output mesh.

Figure 6:
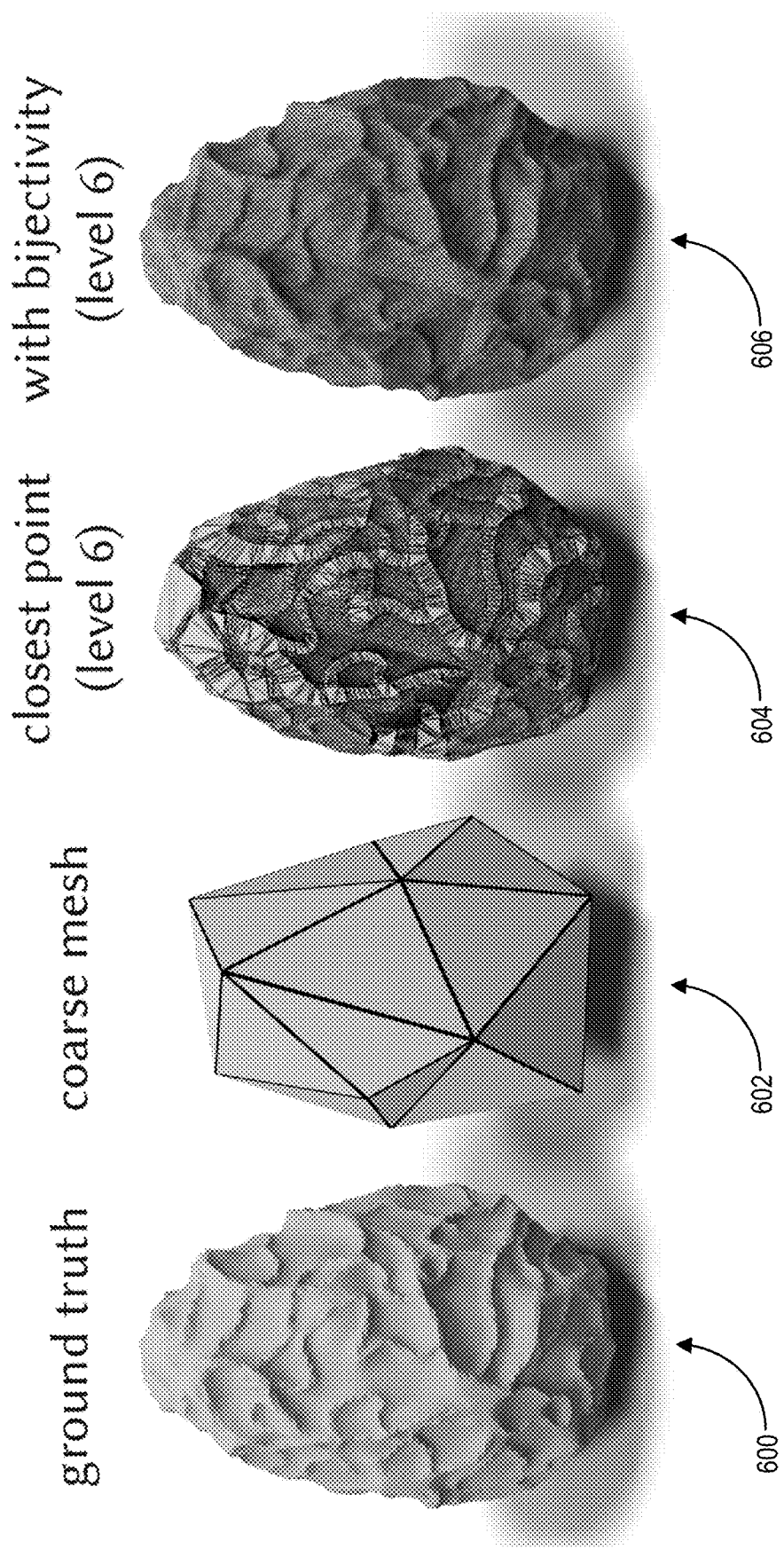
FIG. 6 illustrates a diagram indicating results of reconstructing three-dimensional meshes from a coarse three-dimensional mesh in accordance with one or more implementations.

In addition, utilizing successive self-parameterization to create a bijective map for a coarse mesh three-dimensional mesh provides improved training datasets for learning parameters of a neural network. FIG. 6 illustrates that the mesh decimation system 102 provides improved results over conventional systems by calculating a loss function based on a bijective map. In particular, the mesh decimation system 102 can process a ground truth three-dimensional mesh 600 to generate a coarse three-dimensional mesh 602. Conventional systems that calculate a loss function by naively determining the distance between a predicted point to its projection on the ground truth three-dimensional mesh 600 results in a loss function that fails to capture the entire ground truth three-dimensional mesh 600. FIG. 6 illustrates an example of an output three-dimensional mesh 604 of a naively-trained neural network, which indicates inaccuracies and self-overlapping matches between shapes.

FIG. 6 further illustrates an example of an output three-dimensional mesh 606 of a neural network trained using a bijective map from the mesh decimation system 102. As shown, successive self-parameterization ensures bijectivity between points in the ground truth three-dimensional mesh 600 and the output three-dimensional mesh 606 (e.g., instead of ad-hoc correspondence). By training on fine/coarse pairs with bijective maps based on successive self-parameterization, the mesh decimation system 102 can capture the entire surface of the ground truth three-dimensional mesh 600 in limit to reduce or eliminate artifacts in the output of the neural network.

Figure 7:
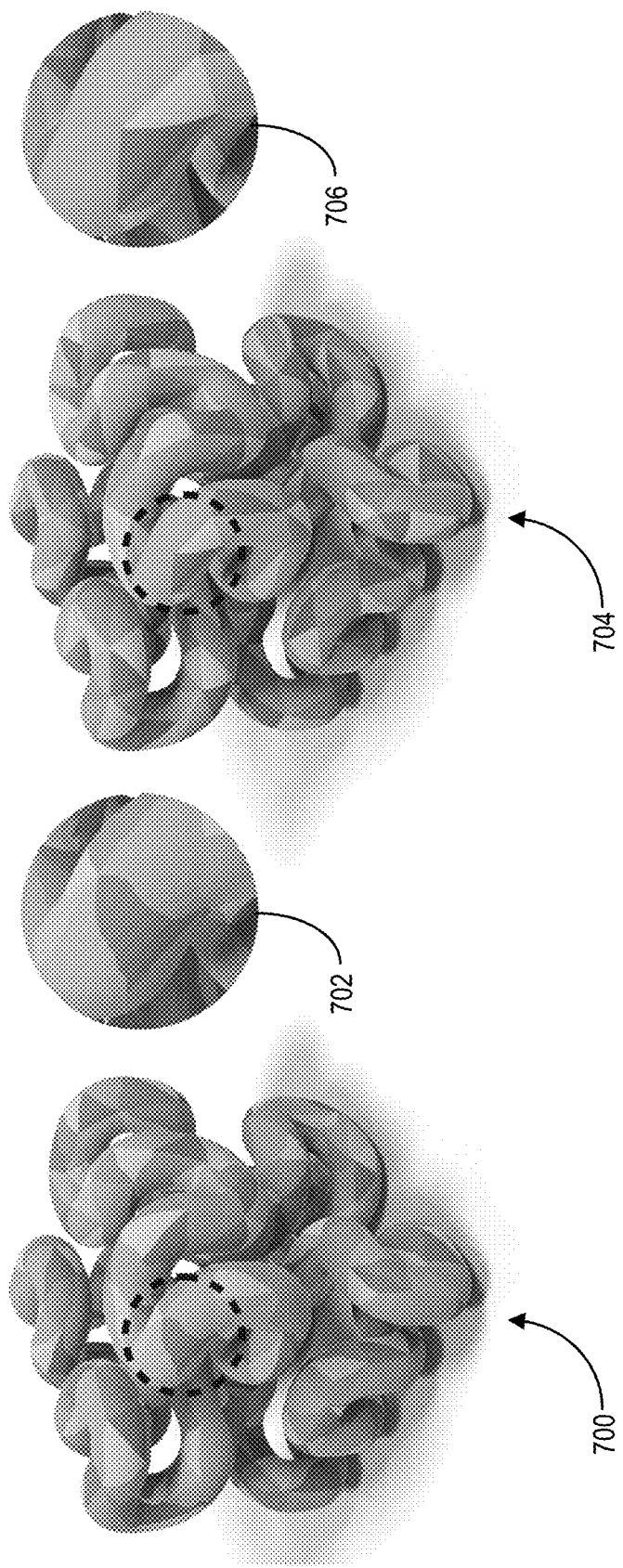
FIG. 7 illustrates a diagram of a comparison of conformal parameterization and non-conformal parameterization in accordance with one or more implementations.

As previously mentioned, the mesh decimation system 102 can use conformal flattening to determine self-parameterization of a three-dimensional mesh for a decimation process. FIG. 7 illustrates that the mesh decimation system 102 improves the accuracy of computing devices involved in the decimation process. In particular, FIG. 7 illustrates that conventional systems that do not use parameterization with conformal flattening results in a decimated three-dimensional mesh 700 with a distorted parameterization. A close-up view 702 of the decimated three-dimensional mesh 700 further indicates that the parameterization is distorted and skewed (e.g., misshapen face boundaries). In contrast, by utilizing conformal flattening with self-parameterization, the mesh decimation system 102 can generate an accurate decimated three-dimensional mesh 704. A close-up view 706 of the decimated three-dimensional mesh 700 from the mesh decimation system 102 indicates that the mesh decimation system 102 reduces the amount of angle distortion accumulated throughout an edge-collapse sequence, as shown by the straight face boundaries.

As described in relation to FIGS. 2A-2B and 3A-3B, the mesh decimation system 102 can perform operations for decimating a mesh utilizing successive self-parameterization. The operations allow the mesh decimation system 102 to accurately decimate a three-dimensional mesh while providing a bijective map for the three-dimensional mesh. Accordingly, the acts and operations illustrated and described above in relation to FIGS. 2A-2B and 3A-3B can provide the corresponding acts (e.g., structure) for a step for collapsing the edges in the three-dimensional mesh and the corresponding edges in the two-dimensional surface mapping space to provide a bijective map for the local geometries.

Figure 8:
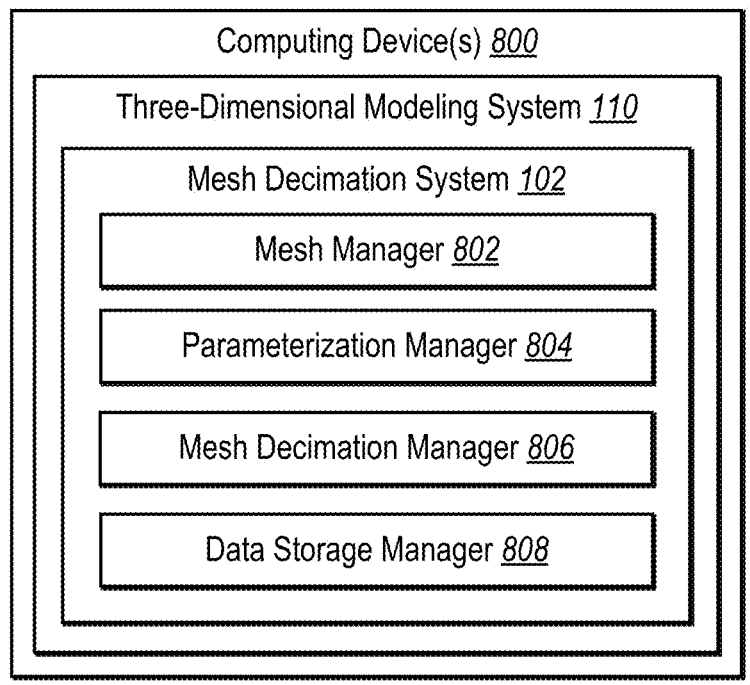
FIG. 8 illustrates a diagram of the mesh decimation system of FIG. 1 in accordance with one or more implementations.

FIG. 8 illustrates a detailed schematic diagram of an embodiment of the mesh decimation system 102 described above. As shown, the mesh decimation system 102 can be implemented in a three-dimensional modeling system 110 on computing device(s) 800 (e.g., a client device and/or server device as described in FIG. 1, and as further described below in relation to FIG. 10). Additionally, the mesh decimation system 102 can include, but is not limited to, a mesh manager 802, a parameterization manager 804, a mesh decimation manager 806, and a data storage manager 808. The mesh decimation system 102 can be implemented on any number of computing devices. For example, the mesh decimation system 102 can be implemented in a distributed system of server devices for decimating and rendering three-dimensional meshes. The mesh decimation system 102 can also be implemented within one or more additional systems. Alternatively, the mesh decimation system 102 can be implemented on a single computing device such as a single client device.

In one or more embodiments, each of the components of the mesh decimation system 102 is in communication with other components using any suitable communication technologies. Additionally, the components of the mesh decimation system 102 can be in communication with one or more other devices including other computing devices of a user, server devices (e.g., cloud storage devices), licensing servers, or other devices/systems. It will be recognized that although the components of the mesh decimation system 102 are shown to be separate in FIG. 8, any of the subcomponents may be combined into fewer components, such as into a single component, or divided into more components as may serve a particular implementation. Furthermore, although the components of FIG. 8 are described in connection with the mesh decimation system 102, at least some of the components for performing operations in conjunction with the mesh decimation system 102 described herein may be implemented on other devices within the environment.

The components of the mesh decimation system 102 can include software, hardware, or both. For example, the components of the mesh decimation system 102 can include one or more instructions stored on a computer-readable storage medium and executable by processors of one or more computing devices (e.g., the computing device(s) 800). When executed by the one or more processors, the computer-executable instructions of the mesh decimation system 102 can cause the computing device(s) 800 to perform the mesh decimation operations described herein. Alternatively, the components of the mesh decimation system 102 can include hardware, such as a special purpose processing device to perform a certain function or group of functions. Additionally, or alternatively, the components of the mesh decimation system 102 can include a combination of computer-executable instructions and hardware.

Furthermore, the components of the mesh decimation system 102 performing the functions described herein with respect to the mesh decimation system 102 may, for example, be implemented as part of a stand-alone application, as a module of an application, as a plug-in for applications, as a library function or functions that may be called by other applications, and/or as a cloud-computing model. Thus, the components of the mesh decimation system 102 may be implemented as part of a stand-alone application on a personal computing device or a mobile device. Alternatively, or additionally, the components of the mesh decimation system 102 may be implemented in any application that provides three-dimensional image rendering, including, but not limited to ADOBE® AERO®, SUBSTANCE STRUCTURE or SUBSTANCE PAINTER® software.

The mesh decimation system 102 can also include a mesh manager 802 to facilitate the management of three-dimensional meshes in a mesh decimation process. For example, the mesh manager 802 can identify a three-dimensional mesh for a decimation process. The mesh manager 802 can also manage levels of decimated three-dimensional meshes (e.g., identifying and storing a mesh after each decimation iteration in connection with the data storage manager 808). Furthermore, the mesh manager 802 can manage a training dataset of coarse/fine mesh pairs for training neural networks in connection with a mesh subdivision neural network.

The mesh decimation system 102 can further include a parameterization manager 804 for parameterization a three-dimensional mesh during mesh decimation operations. For instance, the parameterization manager 804 can perform operations for successive self-parameterization with an edge-collapse algorithm for collapsing edges in local geometries of the three-dimensional mesh. The parameterization manager 804 can convert local geometries of edges in a three-dimensional mesh from a three-dimensional space to a two-dimensional surface mapping space and back (e.g., before and after collapsing edges) to determine a self-parameterization for the decimated three-dimensional mesh. The parameterization manager 804 can perform successive self-parameterization across a plurality of decimation iterations.

The mesh decimation system 102 can also include a mesh decimation manager 806 to facilitate decimation of a three-dimensional mesh. Specifically, the mesh decimation manager 806 can utilize an edge-collapse algorithm to collapse edges across the surface of a three-dimensional mesh in a decimation iteration. The mesh decimation manager 806 can further perform a plurality of decimation iterations on a three-dimensional mesh in connection with the parameterization manager 804 to obtain a bijective map that provides one-to-one correspondences between points in a decimated three-dimensional mesh and points in an input three-dimensional mesh, including across one or more intermediate decimated three-dimensional meshes.

Additionally, the mesh decimation system 102 also includes a data storage manager 808 (that comprises a non-transitory computer memory/one or more memory devices) that stores and maintains data associated with decimating three-dimensional meshes. For example, the data storage manager 808 can store local geometries in a three-dimensional space and a two-dimensional surface mapping space before and after an edge-collapse operation. The data storage manager 808 can also store information associated with training a mesh subdivision neural network (e.g., the mesh subdivision neural network and/or fine/coarse mesh pairs with bijective maps for training the mesh subdivision neural network).

Figure 9:
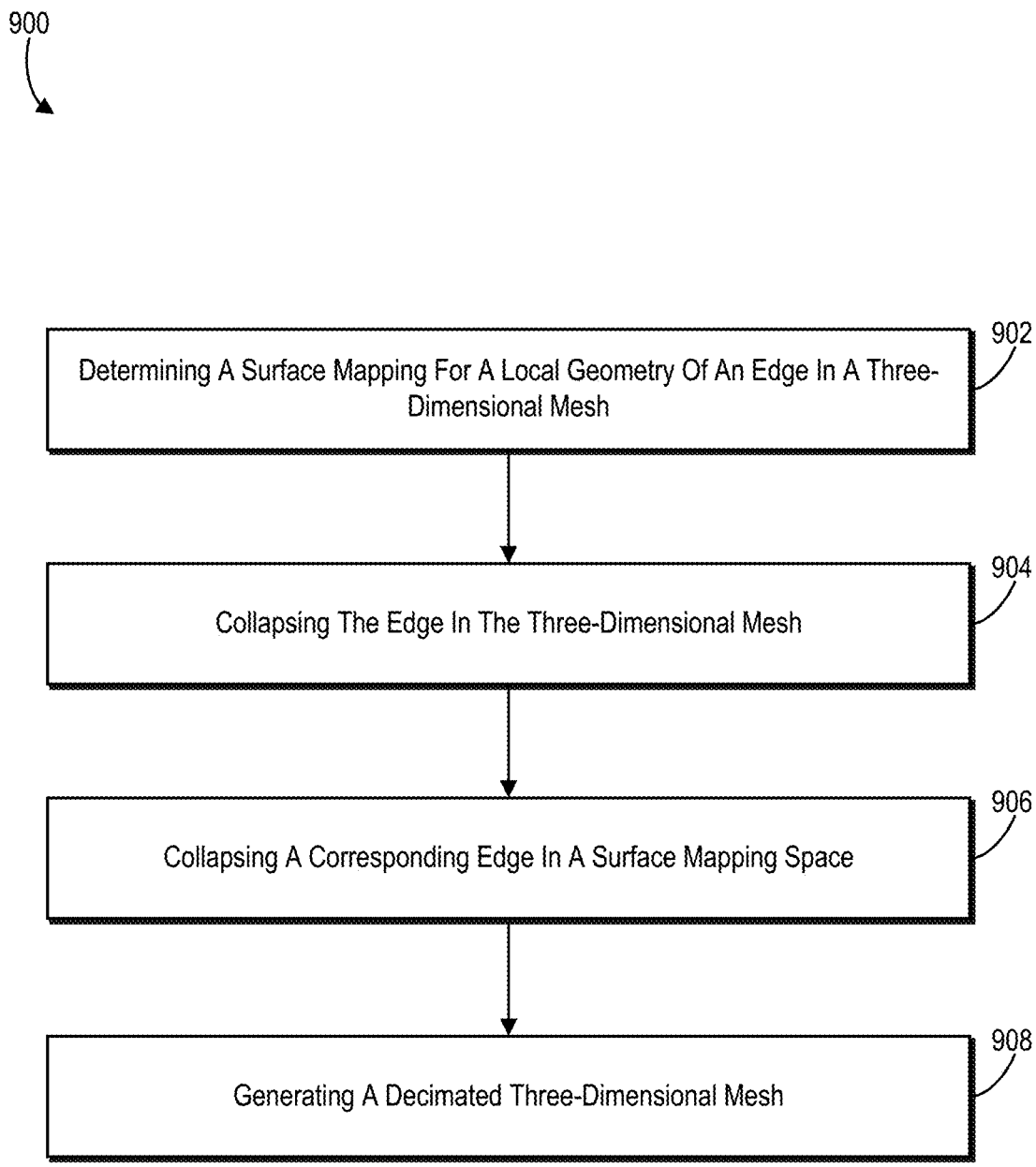
FIG. 9 illustrates a flowchart of a series of acts for decimating a three-dimensional mesh utilizing successive self-parameterization in accordance with one or more implementations.

Turning now to FIG. 9, this figure shows a flowchart of a series of acts 900 of performing mesh decimation utilizing successive self-parameterization. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9.

As shown, the series of acts 900 includes an act 902 of determining a surface mapping for a local geometry of an edge in a three-dimensional mesh. For example, act 902 involves determining a surface mapping between a plurality of vertices in a first local geometry associated with a first edge in a three-dimensional mesh and a second local geometry associated with a second edge in a two-dimensional surface mapping space. Act 902 can involve determining the surface mapping between a one-ring neighborhood associated with vertices that form the first edge in the three-dimensional mesh and a corresponding one-ring neighborhood associated with vertices that form the second edge in the two-dimensional surface mapping space. Act 902 can further involve utilizing conformal flattening to map a curved surface of the one-ring neighborhood in the three-dimensional mesh to a two-dimensional surface of the corresponding one-ring neighborhood in the two-dimensional surface mapping space prior to collapsing the first edge in the three-dimensional mesh.

The series of acts 900 also includes an act 904 of collapsing the edge in the three-dimensional mesh. For example, act 904 involves collapsing the first edge in the three-dimensional mesh by combining vertices that form the first edge to generate a first new vertex in the three-dimensional mesh. To illustrate, act 904 can involve combining the vertices that form the first edge to generate the first new vertex at a midpoint of the first edge. Act 904 can involve determining a boundary shape of the plurality of vertices in the first local geometry associated with the first edge in a three-dimensional mesh. Act 904 can further involve collapsing the first edge in the three-dimensional mesh while maintaining the boundary shape for the first local geometry.

Act 904 can also involve determining that collapsing the first edge results in a valid edge collapse according to a set of collapse validity criteria. Act 904 can then involve collapsing the first edge in the three-dimensional mesh in response to determining that collapsing the first edge results in the valid edge collapse.

Additionally, the series of acts 900 includes an act 906 of collapsing a corresponding edge in a surface mapping space. For example, act 906 involves collapsing, based on the surface mapping, the second edge in the two-dimensional surface mapping space by combining vertices that form the second edge to generate a second new vertex in the two-dimensional surface mapping space such that collapsing the first edge in the three-dimensional mesh and the second edge in the two-dimensional surface mapping space results in a bijective map for the first local geometry in the three-dimensional mesh. Act 906 can involve utilizing conformal flattening to update, in response to collapsing the first edge in the three-dimensional mesh, the surface mapping between the one-ring neighborhood of the first edge and the corresponding one-ring neighborhood of the second edge according to a fixed boundary of the one-ring neighborhood in the two-dimensional surface mapping space.

As part of act 906, or as an additional act, the series of acts 900 can include generating the bijective map for the first local geometry in the three-dimensional mesh. For example, the series of acts 900 can include determining barycentric coordinates within the new local geometry associated with the collapsed edge in the decimated three-dimensional mesh. The series of acts 900 can then include mapping, according to the surface mapping, the barycentric coordinates within the new local geometry in the decimated three-dimensional mesh to corresponding barycentric coordinates within the first local geometry in the three-dimensional mesh.

The series of acts 900 further includes an act 908 of generating a decimated three-dimensional mesh. For example, act 908 involves generating a decimated three-dimensional mesh comprising a new local geometry associated with the collapsed first edge. Act 908 can involve generating the decimated three-dimensional mesh comprising a plurality of new local geometries associated with collapsing a plurality of edges in the three-dimensional mesh.

Act 908 can also involve generating, from the three-dimensional mesh, a final decimated three-dimensional mesh across a plurality of decimation iterations on a plurality of levels of decimated three-dimensional meshes via a plurality of successive self-parameterizations across the plurality of decimation iterations resulting in a plurality of bijective maps for the plurality of levels of decimated three-dimensional meshes. Act 908 can further involve generating, according to the plurality of successive self-parameterizations, a final bijective map that maps the final decimated three-dimensional mesh to the three-dimensional mesh via the plurality of bijective maps.

The series of acts 900 can also include processing the final decimated three-dimensional mesh utilizing a mesh subdivision neural network that subdivides three-dimensional meshes. The series of acts 900 can then include determining a loss by comparing a predicted subdivided three-dimensional mesh from the mesh subdivision neural network to the three-dimensional mesh using the final bijective map. Additionally, the series of acts 900 can include learning the parameters of the mesh subdivision neural network based on the loss.

Additionally, the series of acts 900 can include generating, from the three-dimensional mesh, a plurality of final decimated three-dimensional mesh across a plurality of decimation iterations using successive self-parameterizations with semi-random edge collapses. The series of acts 900 can also include learning parameters of a mesh subdivision neural network based on a plurality of mesh pairs, wherein each mesh pair of the plurality of mesh pairs comprises the three-dimensional mesh and a final decimated three-dimensional mesh of the plurality of final decimated three-dimensional meshes. Furthermore, the series of acts 900 can include generating a plurality of mesh pairs comprising the plurality of final decimated three-dimensional meshes and a plurality of intermediate three-dimensional meshes associated with the plurality of decimation iterations.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
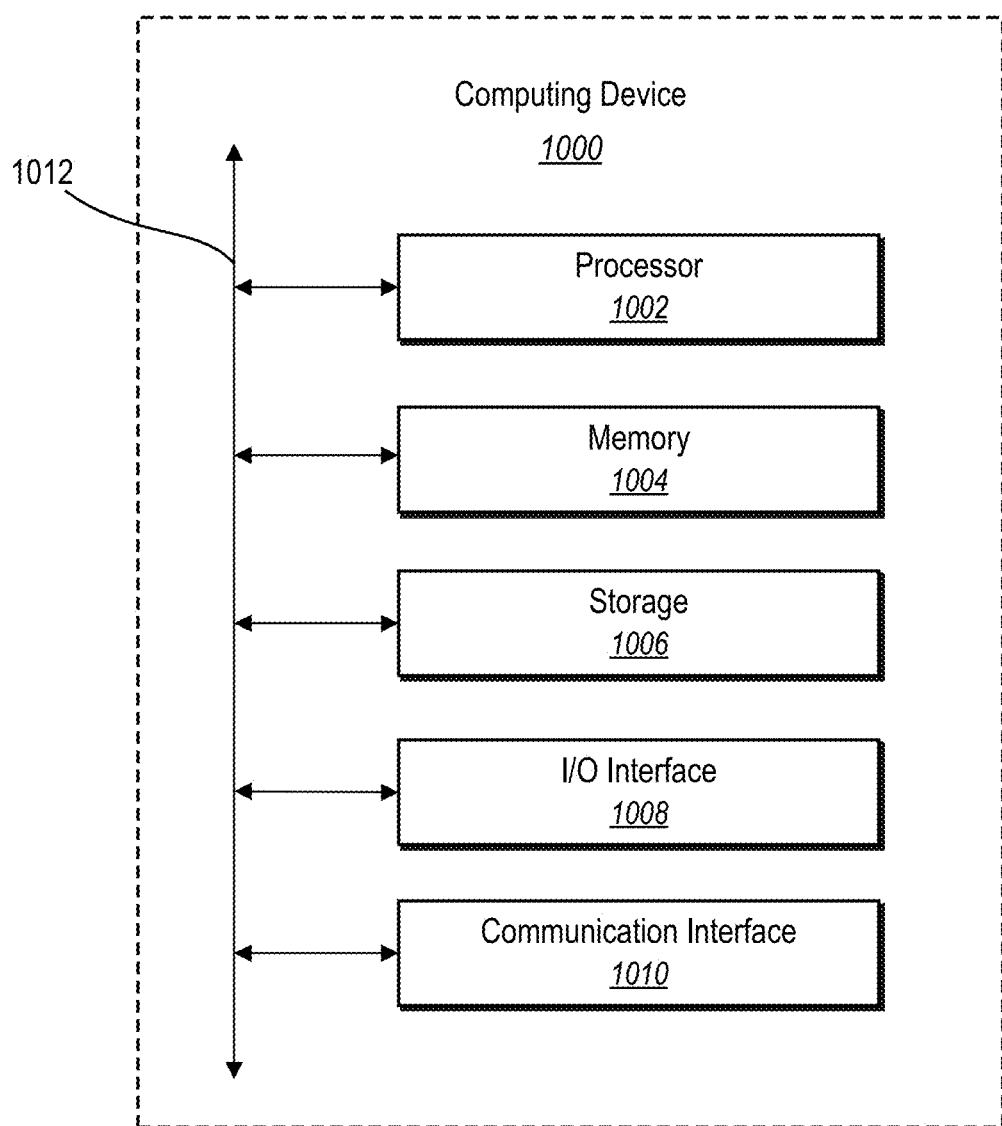
FIG. 10 illustrates a block diagram of an exemplary computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the system(s) of FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions for dynamically modifying workflows, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions for performing the methods described herein.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   determine a surface mapping between a plurality of vertices in a first local geometry associated with a first edge in a three-dimensional mesh and corresponding vertices in a second local geometry associated with a second edge in a two-dimensional surface mapping space, the second local geometry representing the first local geometry in the two-dimensional surface mapping space;
   collapse the first edge in the three-dimensional mesh by combining first vertices that form the first edge to generate a first new vertex in the three-dimensional mesh;
   collapse, based on the surface mapping, the second edge in the two-dimensional surface mapping space by combining second vertices that form the second edge to generate a second new vertex in the two-dimensional surface mapping space such that collapsing the first edge in the three-dimensional mesh and the second edge in the two-dimensional surface mapping space results in a bijective map between first points in the first local geometry in the three-dimensional mesh before collapsing the first edge and second points in a new local geometry in an intermediate three-dimensional mesh comprising the collapsed first edge; and
   generate, across a plurality of decimation iterations of the three-dimensional mesh by successively collapsing edges in the three-dimensional mesh and corresponding edges in the two-dimensional surface mapping space, a final decimated three-dimensional mesh associated with a final bijective map determined via composition of a plurality of bijective maps corresponding to the plurality of decimation iterations.

2. The non-transitory computer readable storage medium as recited in claim 1, wherein the instructions that cause the computing device to determine the surface mapping further cause the computing device to determine the surface mapping between a one-ring neighborhood associated with vertices that form the first edge in the three-dimensional mesh and a corresponding one-ring neighborhood associated with vertices that form the second edge in the two-dimensional surface mapping space.

3. The non-transitory computer readable storage medium as recited in claim 2, wherein the instructions that cause the computing device to determine the surface mapping further cause the computing device to utilize conformal flattening to map a curved surface of the one-ring neighborhood in the three-dimensional mesh to a two-dimensional surface of the corresponding one-ring neighborhood in the two-dimensional surface mapping space prior to collapsing the first edge in the three-dimensional mesh.

4. The non-transitory computer readable storage medium as recited in claim 3, wherein the instructions that cause the computing device to collapse the second edge in the two-dimensional surface mapping space further cause the computing device to utilize conformal flattening to update, in response to collapsing the first edge in the three-dimensional mesh, the surface mapping between the one-ring neighborhood of the first edge and the corresponding one-ring neighborhood of the second edge according to a fixed boundary of the one-ring neighborhood in the two-dimensional surface mapping space.

5. The non-transitory computer readable storage medium as recited in claim 1, wherein the instructions that cause the computing device to collapse the first edge in the three-dimensional mesh further cause the computing device to:
   determine a boundary shape of the plurality of vertices in the first local geometry associated with the first edge in the three-dimensional mesh; and
   collapse the first edge in the three-dimensional mesh while maintaining the boundary shape for the first local geometry.

6. The non-transitory computer readable storage medium as recited in claim 1, wherein the instructions that cause the computing device to collapse the first edge in the three-dimensional mesh further cause the computing device to:
   determine that collapsing the first edge results in a valid edge collapse according to a set of collapse validity criteria; and
   collapse the first edge in the three-dimensional mesh in response to determining that collapsing the first edge results in the valid edge collapse.

7. The non-transitory computer readable storage medium as recited in claim 1, further comprising instructions that, when executed by the at least one processor, cause the computing device to generate the bijective map for the first local geometry in the three-dimensional mesh by:
  determining barycentric coordinates within the new local geometry associated with the collapsed first edge in the decimated three-dimensional mesh; and
  mapping, according to the surface mapping, the barycentric coordinates within the new local geometry in the decimated three-dimensional mesh to corresponding barycentric coordinates within the first local geometry in the three-dimensional mesh.

8. The non-transitory computer readable storage medium as recited in claim 1, further comprising instructions that, when executed by the at least one processor, cause the computing device to:
  generate, from the three-dimensional mesh, the final decimated three-dimensional mesh across the plurality of decimation iterations on a plurality of levels of decimated three-dimensional meshes via a plurality of successive self-parameterizations across the plurality of decimation iterations resulting in the plurality of bijective maps for a plurality of points across the plurality of levels of decimated three-dimensional meshes; and
  generate, according to the plurality of successive self-parameterizations, the final bijective map that maps the final decimated three-dimensional mesh to the three-dimensional mesh via composition of the plurality of bijective maps.

9. The non-transitory computer readable storage medium as recited in claim 8, further comprising instructions that, when executed by the at least one processor, cause the computing device to:
  process the final decimated three-dimensional mesh utilizing a mesh subdivision neural network that subdivides three-dimensional meshes;
  determine a loss by comparing a predicted subdivided three-dimensional mesh from the mesh subdivision neural network to the three-dimensional mesh using the final bijective map; and
  learn parameters of the mesh subdivision neural network based on the loss.

10. The non-transitory computer readable storage medium as recited in claim 8, further comprising instructions that, when executed by the at least one processor, cause the computing device to:
  generate, from the three-dimensional mesh, a plurality of final decimated three-dimensional meshes across a plurality of separate decimation iterations using successive self-parameterizations with semi-random edge collapses; and
  learn parameters of a mesh subdivision neural network based on a plurality of mesh pairs, wherein each mesh pair of the plurality of mesh pairs comprises the three-dimensional mesh and a final decimated three-dimensional mesh of the plurality of final decimated three-dimensional meshes.

11. A system comprising:
  at least one computer memory comprising an initial three-dimensional mesh; and
  one or more servers configured to cause the system to:
  determine a surface mapping between a plurality of vertices in the initial three-dimensional mesh and corresponding vertices in a two-dimensional surface mapping space;
  successively self-parameterizing the initial three-dimensional mesh for each decimation iteration of a plurality of decimation iterations by:
    collapsing edges in the initial three-dimensional mesh by combining selected vertices of the plurality of vertices that form the edges to generate new vertices in the initial three-dimensional mesh; and
    collapsing corresponding edges in the two-dimensional surface mapping space by combining selected vertices of the corresponding vertices that form the corresponding edges to generate new corresponding vertices in the two-dimensional surface mapping space, wherein collapsing the edges in the initial three-dimensional mesh and the corresponding edges in the two-dimensional surface mapping space results in bijective maps between first points in local geometries of the edges in the initial three-dimensional mesh before collapsing the edges and second points in new local geometries after collapsing the edges; and
  generate, in response to the plurality of decimation iterations, a decimated three-dimensional mesh associated with a final bijective map that maps the decimated three-dimensional mesh to the initial three-dimensional mesh via composition of one or more additional bijective maps associated with one or more intermediate three-dimensional meshes.

12. The system as recited in claim 11, wherein the one or more servers are further configured to cause the system to determine the surface mapping by utilizing conformal flattening to determine the surface mapping between a one-ring neighborhood associated with vertices that form an edge in the initial three-dimensional mesh and a corresponding one-ring neighborhood associated with vertices that form a corresponding edge in the two-dimensional surface mapping space.

13. The system as recited in claim 12, wherein the one or more servers are further configured to cause the system to utilize conformal flattening to update, in response to collapsing the edge in the initial three-dimensional mesh, the surface mapping between the one-ring neighborhood associated with the vertices that form the edge in the initial three-dimensional mesh and the corresponding one-ring neighborhood associated with the vertices that form the corresponding edge in the two-dimensional surface mapping space.

14. The system as recited in claim 11, wherein the one or more servers are further configured to cause the system to collapse the corresponding edges in the two-dimensional surface mapping space by:
  determining a boundary shape of a local geometry of a corresponding edge in the two-dimensional surface mapping space; and
  collapsing the corresponding edge in the two-dimensional surface mapping space while maintaining the boundary shape for the local geometry.

15. The system as recited in claim 11, wherein the one or more servers are further configured to cause the system to collapse the edges in the initial three-dimensional mesh by:
  determining that collapsing an edge results in a valid edge collapse according to a set of collapse validity criteria; and
  collapsing the edge in the initial three-dimensional mesh in response to determining that collapsing the edge results in the valid edge collapse.

16. The system as recited in claim 11, wherein the one or more servers are further configured to generate the final bijective map by:

determining a plurality of bijective maps corresponding to the plurality of decimation iterations by mapping points across the one or more intermediate three-dimensional meshes; and generating the final bijective map by combining the plurality of bijective maps corresponding the plurality of decimation iterations utilizing composition of the plurality of bijective maps.

17. The system as recited in claim 11, wherein the one or more servers are further configured to cause the system to:

process the decimated three-dimensional mesh across a plurality of subdivision iterations utilizing a mesh subdivision neural network that subdivides three-dimensional meshes;

determine a loss by comparing a plurality of predicted subdivided three-dimensional meshes for the plurality of subdivision iterations from the mesh subdivision neural network to the initial three-dimensional mesh and the one or more intermediate three-dimensional meshes using the final bijective map; and learn parameters of the mesh subdivision neural network based on the loss.

18. A computer-implemented method comprising:

determining, by at least one processor, a surface mapping between a plurality of vertices in local geometries associated with edges in a three-dimensional mesh and a corresponding local geometries associated with corresponding edges in a two-dimensional surface mapping space;

performing a step for collapsing the edges in the three-dimensional mesh and the corresponding edges in the two-dimensional surface mapping space to provide a bijective map for the local geometries; and generating, by the at least one processor and across a plurality of decimation iterations of the three-dimensional mesh by successively collapsing the edges in the three-dimensional mesh and corresponding edges in the two-dimensional surface mapping space, a final decimated three-dimensional mesh associated with a final bijective map determined via composition of a plurality of bijective maps corresponding to the plurality of decimation iterations.

19. The computer-implemented method as recited in claim 18, wherein determining the surface mapping comprises utilizing conformal flattening to determine the surface mapping between the local geometries associated with the edges in the three-dimensional mesh and the corresponding local geometries associated with the corresponding edges in the two-dimensional surface mapping space.

20. The computer-implemented method as recited in claim 18, further comprising:

generating, from the three-dimensional mesh, the final decimated three-dimensional mesh across the plurality of decimation iterations via a plurality of successive self-parameterizations resulting in the plurality of bijective maps for a plurality of points across the plurality of decimation iterations; and generate, according to the plurality of successive self-parameterizations, the final bijective map that maps the final decimated three-dimensional mesh to the three-dimensional mesh via composition of the plurality of bijective maps.

* * * * *